(12) United States Patent
Yamamoto et al.

(10) Patent No.: US 12,021,793 B2
(45) Date of Patent: *Jun. 25, 2024

(54) BASE STATION, TERMINAL, AND COMMUNICATION METHOD

(71) Applicant: Panasonic Intellectual Property Corporation of America, Torrance, CA (US)

(72) Inventors: Tetsuya Yamamoto, Kanagawa (JP); Alexander Golitschek Edler Von Elbwart, Hessen (DE); Lilei Wang, Beijing (CN); Ayako Horiuchi, Kanagawa (JP); Hidetoshi Suzuki, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/350,607

(22) Filed: Jul. 11, 2023

(65) Prior Publication Data
US 2023/0353331 A1    Nov. 2, 2023

Related U.S. Application Data

(63) Continuation of application No. 17/476,338, filed on Sep. 15, 2021, now Pat. No. 11,750,355, which is a
(Continued)

(51) Int. Cl.
*H04L 5/00* (2006.01)
*H04W 72/20* (2023.01)
*H04W 72/0453* (2023.01)

(52) U.S. Cl.
CPC .......... *H04L 5/0092* (2013.01); *H04W 72/20* (2023.01); *H04L 5/001* (2013.01); *H04L 5/0048* (2013.01); *H04W 72/0453* (2013.01)

(58) Field of Classification Search
CPC ..... H04L 5/0092; H04L 5/001; H04L 5/0048; H04L 27/26025; H04L 5/1469;
(Continued)

(56) References Cited

U.S. PATENT DOCUMENTS 9,736,843 B2    8/2017  Mizusawa
2011/0085457 A1  4/2011  Chen et al.
(Continued)

FOREIGN PATENT DOCUMENTS

CN    103733560 A    4/2014
CN    107046721 B    3/2020
(Continued)

OTHER PUBLICATIONS

3GPP TS 36.211 V13.3.0, "3rd Generation Partnership Project; Technical Specification Group Radio Access Network; Evolved Universal Terrestrial Radio Access (E-UTRA); Physical channels and modulation (Release 13)," Sep. 2016, 169 pages.
(Continued)

*Primary Examiner* — Hardikkumar D Patel
(74) *Attorney, Agent, or Firm* — Seed IP Law Group LLP

(57) ABSTRACT

A communication apparatus includes circuitry that determines a number of resource blocks forming a resource block group, which is a unit used to allocate a resource to the communication apparatus, in a first band or in a second band that is an expanded band to which the first band is expanded, and a subcarrier spacing for the second band is same or different from a subcarrier spacing for the first band; and a transceiver that is coupled to the circuitry and that communicates with a base station using the resource. One of the number of resource blocks set for the first band and the number of resource blocks set for the second band is an integer multiple of the other, and the number of resource blocks set for the first band and the number of resource
(Continued)

blocks set for the second band are values that are a power of two.

18 Claims, 23 Drawing Sheets

Related U.S. Application Data continuation of application No. 16/471,852, filed as application No. PCT/CN2017/070379 on Jan. 6, 2017, now Pat. No. 11,153,057.

(58) Field of Classification Search
CPC . H04L 5/0044; H04L 27/2602; H04L 5/0091; H04L 5/0053; H04L 5/0007; H04L 5/0064; H04L 25/0224; H04L 5/006; H04L 5/0041; H04L 5/0057; H04W 72/0406; H04W 72/0453; H04W 72/04; H04W 72/042; H04W 72/085; H04W 72/0486; H04W 24/00; H04W 88/08; H04B 1/713
See application file for complete search history.

(56) References Cited

U.S. PATENT DOCUMENTS

| | | | |
|---|---|---|---|
| 2011/0096783 A1* | 4/2011 | Cai | H04L 5/0044 370/395.4 |
| 2012/0008589 A1* | 1/2012 | Iwai | H04W 72/0453 370/329 |
| 2012/0014330 A1 | 1/2012 | Damnjanovic et al. | |
| 2012/0087331 A1 | 4/2012 | Seo et al. | |
| 2013/0046028 A1 | 2/2013 | Deeth et al. | |
| 2013/0070692 A1 | 3/2013 | Miki et al. | |
| 2013/0155883 A1 | 6/2013 | Bhattacharjee et al. | |
| 2013/0176952 A1 | 7/2013 | Shin et al. | |
| 2013/0182673 A1 | 7/2013 | Takeda et al. | |
| 2014/0098785 A1 | 4/2014 | Frenne et al. | |
| 2015/0131546 A1* | 5/2015 | Seo | H04W 72/04 370/329 |
| 2016/0014778 A1 | 1/2016 | Zhou et al. | |
| 2016/0142919 A1 | 5/2016 | Baldemair et al. | |
| 2017/0111933 A1* | 4/2017 | Wu | H04W 72/0446 |
| 2019/0045553 A1 | 2/2019 | Zhang et al. | |

FOREIGN PATENT DOCUMENTS

| | | |
|---|---|---|
| JP | 2011-142598 A | 7/2011 |
| JP | 2013-525452 A | 6/2013 |

OTHER PUBLICATIONS

3GPP TS 36.213 V13.3.0, "3rd Generation Partnership Project; Technical Specification Group Radio Access Network; Evolved Universal Terrestrial Radio Access (E-UTRA); Physical layer procedures (Release 13)," Sep. 2016, 385 pages.

Huawei et al., "Motivation for new work item proposal on LTE bandwidth flexibility enhancements," RP-151890, Agenda Item: 14.1.1, 3GPP TSG RAN Meeting #70, Sitges, Spain, Dec. 7-10, 2015, 9 pages.

Intel Corporation, "Routing restriction and security for aggregation within NR," R2-166886, Agenda item: 9.2.2.4, 3GPP TSG-RAN WG2 Meeting #95bis, Kaohsiung, Taiwan, Oct. 10-14, 2016, 3 pages.

International Search Report, dated Sep. 30, 2017, for corresponding International Application No. PCT/CN2017/070379, 2 pages.

MediaTek et al., "Way Forward on UE bandwidth adaptation in NR," R1-1613218, Agenda item 7.1.4, 3GPP TSG-RAN WG1 #87, Reno, USA, Nov. 14-18, 2016, 5 pages.

Nokia, Alcatel-Lucent Shanghai Bell, "On the number of subcarriers per PRB," R1-1609657, Agenda item: 8.1.2.1, 3GPP TSG-RAN WG1 #86bis, Lisbon, Portugal, Oct. 10-14, 2016, 2 pages.

Panasonic et al., "Way Forward on synchronized carrier and segment," R1-130786, Agenda Item: 7.3.1.3, RAN1#72, St Julian's, Malta, Jan. 28-Feb. 1, 4 pages.

"RAN1 Chairman's Notes," 3GPP TSG RAN WG1 Meeting #85, Nanjing, China May 23-27, 2016, 126 pages.

Huawei, HiSilicon, "Mechanisms of bandwidth adaptation for control and data reception in; single-carrier and multi-carrier cases," R1-1611655, Agenda Item: 7.1.1, 3GPP TSG RAN WG1 Meeting #87, Reno, USA, Nov. 14-18, 2016. (4 pages).

LG Electronics, "Discussion on Dynamic Bandwidth Adaptation," R1-1611838, Agenda Item: 7.1.4.1, 3GPP TSG RAN WG1 Meeting #87, Reno, USA Nov. 14-18, 2016. (4 pages).

* cited by examiner

100

200

BASE STATION, TERMINAL, AND COMMUNICATION METHOD

TECHNICAL FIELD

The present disclosure relates to a base station, a terminal, and a communication method.

BACKGROUND ART

With the recent spread of services using mobile broadband, the data traffic in mobile communication has been exponentially increasing. For this reason, the expansion of data transmission capacity for the upcoming feature has been considered an urgent task. In addition, drastic advancements in Internet of Things (IoT) in which any kind of "things" are connected together via the Internet are expected in the years to come. In order to support diversification of services with IoT, drastic advancements are required not only in the data transmission capacity but also in various requirements such as low latency and communication areas (coverage). With this background in mind, technical development and standardization of the $5^{th}$ generation mobile communication systems (5G) have been made, which significantly improves the performances and features as compared with the $4^{th}$ generation mobile communication systems (4G).

Long Term Evolution (LTE)-Advanced, which has been standardized by the 3rd generation partnership project (3GPP), is known as a 4G Radio Access Technology (RAT). The 3GPP has been making the technical development of a new RAT (NR) not necessarily having backward compatibility with LTE-Advanced in the standardization of 5G.

In LTE-Advanced enhancement, studies have been conducted on improving the system throughput by extending the operation bandwidths (1.4, 3, 5, 10, 15, and 20 MHz) of the existing LTE system and thereby flexibly supporting various bandwidths (such as 1.8, 2.0, 2.2, 4.4, 4.6, 6.0, 6.2, 7.0, 7.8, 8.0, 11, 14, 18, and 19 MHz) to utilize as much as possible the frequency band allocated to the operator (e.g., see Non-Patent Literature (hereinafter, referred to as "NPL") 1).

In NR, an operation bandwidth of several hundreds MHz is supposedly supported. Meanwhile, power consumption of terminals increases in proportion to a radio frequency (RF) bandwidth. For this reason, in NR, when a terminal receives a downlink (DL) control signal using a bandwidth similar to a network operation bandwidth as in LTE, power consumption of the terminal increases. Thus, in NR, studies have been conducted on allowing terminals to receive a DL control signal using a narrow bandwidth compared with the network operation bandwidth and making the RF bandwidth of the terminals flexibly changeable as appropriate (e.g., the RF bandwidth of the terminals is extended for transmission and/or reception of a data signal) (see, e.g., NPLs 2 and 3).

Carrier Aggregation (CA), which is introduced in LTE-Advanced, is one of the methods of extending a bandwidth. CA is a method of extending a bandwidth by combining multiple bands of the operation bandwidth of the existing LTE system. For this reason, when CA is applied to the above system in which the bandwidth is flexibly changeable, some frequency bandwidths (e.g., 1.8, 2.0, 2.2, 4.6, 6.2, 7.0, 14 and 19 MHz) are unusable in the combination of the operation bandwidth of the existing LTE system. In addition, CA, which combines component carriers of a narrow bandwidth, requires transmission and scheduling of a control signal for each of the component carriers, and thus causes an increase in the overhead for the control signal, thus being inefficient. Moreover, the terminals are required to have the CA capability even when the operation bandwidth is narrowband. For example, in case of 11 MHz, the terminals are required to have the capability of combining three component carriers, which are 5 MHz+3 MHz+3 MHz. Thus, the complexity of terminals increases.

In this respect, as a method of extending a band without using the CA capability and mechanism, a method has been discussed in which an extension band so called a "segment" is added to the existing LTE band (e.g., see, NPL 4). In this method, scheduling for the existing LTE band (hereinafter, referred to as "Backward Compatible Carrier (BCC)") and the segment can be made by one DL control signal, so that the overhead for the control signal can be reduced. Moreover, this method does not require the terminals to have the CA capability even when the operation bandwidth is narrowband, so that the complexity of the terminals can be reduced. Thus, this method of adding a segment is more efficient than the CA mechanism in the above system, which flexibly supports various bandwidths.

CITATION LIST

Non-Patent Literature

NPL 1
RP-151890, "Motivation for new work item proposal on LTE bandwidth flexibility enhancements," Huawei, China Unicom, HiSilicon, RAN #70, December 2015
NPL 2
R1-1613218, "Way Forward on UE bandwidth adaptation in NR," MediaTek, Acer, AT&T, CHTTL, Ericsson, III, InterDigital, ITRI, NTT Docomo, Qualcomm, Samsung, Verizon, RANI #87, November 2016
NPL 3
RANI #85 chairman's note
NPL 4
R1-130786, "Way Forward on synchronized carrier and segment," Panasonic, KDDI, AT&T, Qualcomm, Motorola Mobility, New Postcom, Interdigital, RANI #72, February 2013
NPL 5
3GPP TS 36.213 V13.3.0, "Evolved Universal Terrestrial Radio Access (E-UTRA); Physical layer procedures (Release 13)," September 2016
NPL 6
3GPP TS 36.211 V13.3.0, "Evolved Universal Terrestrial Radio Access (E-UTRA); Physical channels and modulation (Release 13)," September 2016

SUMMARY OF INVENTION

As described above, studies need to be conducted on a detailed mechanism such as a method of determining a parameter required for an operation in a flexible bandwidth (e.g., bandwidth to which a segment has been added) in a case where the method of adding a segment is applied in a radio communication system flexibly that supports various bandwidths in LTE-Advanced described above and a radio communication system that enables flexibly changing the RF bandwidth of terminals in NR.

One non-limiting and exemplary embodiment facilitates providing a base station, a terminal, and a communication method capable of appropriately determining a parameter required for an operation in a flexible bandwidth.

A base station according to an aspect of this disclosure includes: circuitry, which, in operation, determines a parameter for a band composed of a first band and a segment that is an additional band for the first band, the band composed of the first band and the segment being referred to a second band; and a transceiver, which in operation, communicates with a terminal in the second band, using the parameter.

A terminal according to an aspect of this disclosure includes: circuitry, which, in operation, determines a parameter for a band composed of a first band and a segment that is an additional band for the first band, the band composed of the first band and the segment being referred to as a second band; and a transceiver, which in operation, communicates with a base station in the second band, using the parameter.

A communication method according to an aspect of this disclosure includes: determining a parameter for a band composed of a first band and a segment that is an additional band for the first band, the band composed of the first band and the segment being referred to as a second band; and communicating with a terminal in the second band, using the parameter.

A communication method according to an aspect of this disclosure includes: determining a parameter for a band composed of a first band and a segment that is an additional band for the first band, the band composed of the first band and the segment being referred to as a second band; and communicating with a base station in the second band, using the parameter.

Note that the comprehensive or specific aspects mentioned above may be implemented by a system, an apparatus, a method, an integrated circuit, a computer program or a recoding medium, or any combination of the system, the apparatus, the method, the integrated circuit, the computer program, and the recoding medium.

According to an aspect of this disclosure, a parameter required for an operation in a flexible bandwidth can be appropriately determined.

The specification and the drawings make it clear more advantages and effects in an aspect of this disclosure. Such advantages and/or effects are provided by the features disclosed in some embodiments as well as the specification and the drawings, but all of them do not have to be provided in order to obtain one or more identical features.

DESCRIPTION OF EMBODIMENTS

Hereinafter, a detailed description will be given of embodiments of the present disclosure with reference to the accompanying drawings.

In an aspect of the present disclosure, an extended band containing a BCC and a segment is regarded as one virtual carrier, and a method of determining a parameter required for an operation with respect to the virtual carrier will be described. According to this method, a base station can perform scheduling for resource allocation for the extended band containing a BCC and a segment after addition of the segment, using one DL control signal. Moreover, it is made possible to suppress changes from the existing resource allocation mechanism to be small.

Embodiment 1

[Summary of Communication System]

A communication system according to each embodiment of the present disclosure includes base station 100 and terminal 200.

Figure 1:
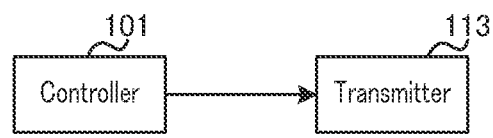
FIG. 1 is a block diagram illustrating a configuration of a base station according to Embodiment 1.

FIG. 1 is a block diagram illustrating a configuration of base station 100 according to each embodiment of the present disclosure. In base station 100 illustrated in FIG. 1, controller 101 determines a parameter (RBG size herein) for a second band (virtual carrier) composed of a first band and a segment, which is an additional band for the first band, and transmitter 113 (corresponding to a transceiver, and including signal assigner 111) communicates with terminal 200 in the second band, using the parameter.

Figure 2:
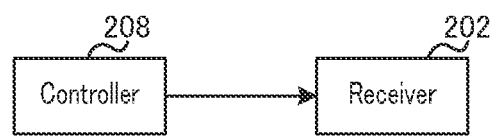
FIG. 2 is a block diagram illustrating a configuration of a terminal according to Embodiment 1.

FIG. 2 is a block diagram illustrating a configuration of terminal 200 according to each embodiment of the present disclosure. In terminal 200 illustrated in FIG. 2, controller 208 determines a parameter (RBG size) for a second band (virtual carrier) composed of a first band and a segment, which is an additional band for the first band, and receiver 202 (corresponding to a transceiver, and including extractor 204) communicates with base station 100 in the second band, using the parameter.

Note that, hereinafter, the term "BCC," or "first RF band," which is a band required for terminal 200 to receive a DL control signal (e.g., Downlink Control Information (DCI)) is defined as a "first band."

Moreover, hereinafter, an extended band containing a BCC and a segment after addition of the segment to the first band is defined as a "virtual carrier" or "second band."

[Configuration of Base Station]

Figure 3:
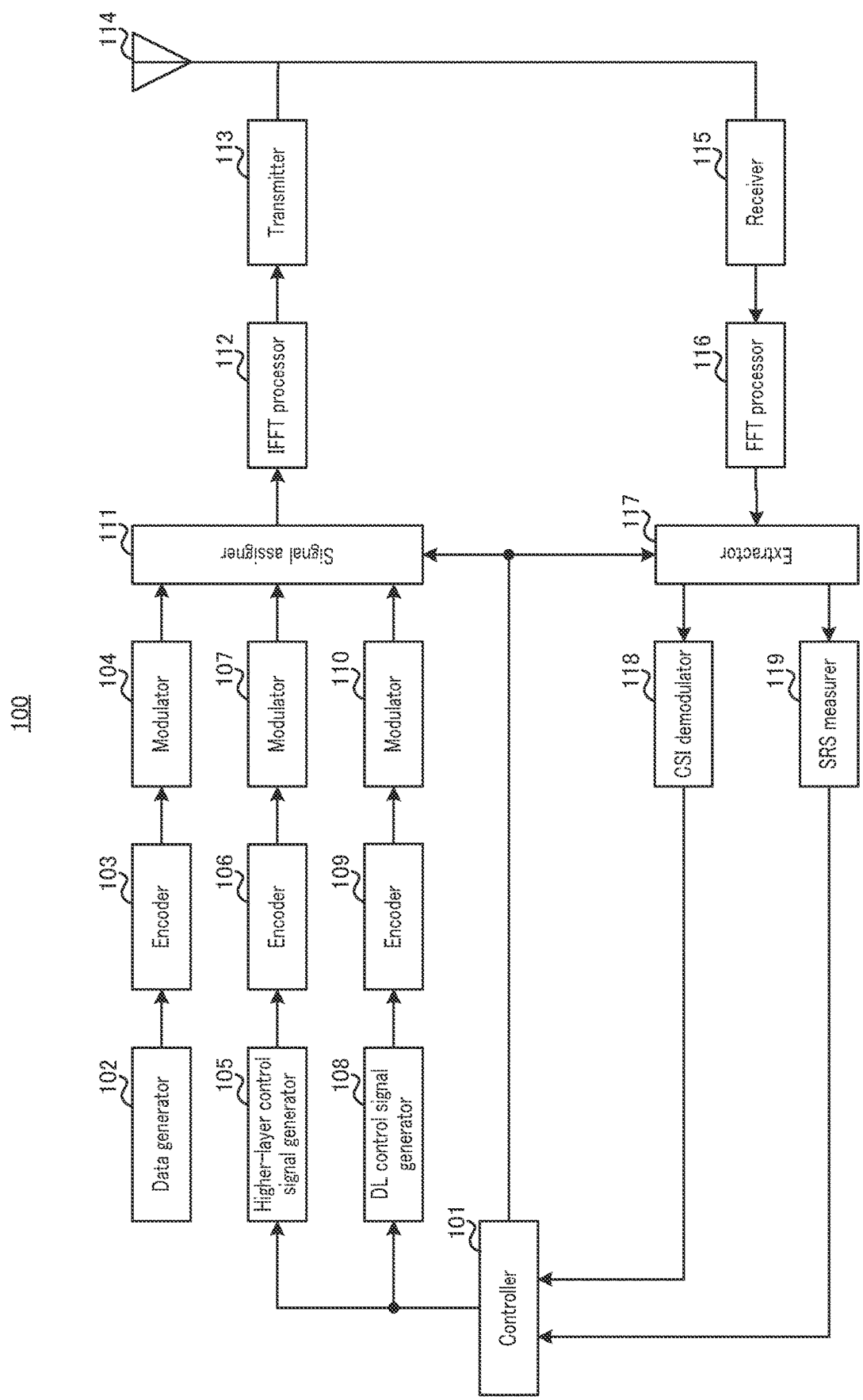
FIG. 3 is a block diagram illustrating a configuration of the base station according to Embodiment 1.

FIG. 3 is a block diagram illustrating a configuration of base station 100 according to Embodiment 1 of the present disclosure. In FIG. 3, base station 100 includes controller 101, data generator 102, encoder 103, modulator 104, higher-layer control signal generator 105, encoder 106, modulator 107, DL control signal generator 108, encoder 109, modulator 110, signal assigner 111, inverse fast Fourier transform (IFFT) processor 112, transmitter 113, antenna 114, receiver 115, fast Fourier transform (FFT) processor 116, extractor 117, Channel State Information (CSI) demodulator 118, and Sounding Reference Signal (SRS) measurer 119.

Controller 101 determines a Resource Block Group (RBG) size for a virtual carrier (second band). At this time, controller 101 outputs information indicating the determined RBG size for the virtual carrier to signal assigner 111. Note that, controller 101 may output the information indicating the determined RBG size for the virtual carrier to higher-layer control signal generator 105.

In addition, controller 101 determines information on a CSI feedback or SRS and outputs the determined information to higher-layer control signal generator 105 and extractor 117 (details will be given, hereinafter in Embodiments 9 to 12). Moreover, when the configuration of the RBG (RBG size or RBG boundary) for the virtual carrier is configurable, controller 101 outputs information on change in configuration to higher-layer control signal generator 105 (details will be given, hereinafter in Embodiments 4 and 6).

Furthermore, controller 101, for example, determines radio resource allocation for DL data to terminal 200, using the determined RBG, and outputs DL resource allocation information indicating the resource allocation for the DL data to DL control signal generator 108 and signal assigner 111.

Data generator 102 generates DL data for terminal 200 and outputs the DL data to encoder 103.

Encoder 103 applies error correction coding to the DL data inputted from data generator 102 and outputs the encoded data signal to modulator 104.

Modulator 104 modulates the data signal inputted from encoder 103 and outputs the data modulation signal to signal assigner 111.

Higher-layer control signal generator 105 generates a control information bit sequence, using the information inputted from controller 101, and outputs the generated control information bit sequence to encoder 106. Moreover, higher-layer control signal generator 105 generates a control information bit sequence, using information (e.g., bandwidth) on a first band (BCC or first RF band) and information (e.g., bandwidth) on a segment (additional band), and outputs the generated control information bit sequence to encoder 106.

Encoder 106 applies error correction coding to the control information bit sequence inputted from higher-layer control signal generator 105 and outputs the encoded control signal to modulator 107.

Modulator 107 modulates the control signal inputted from encoder 106 and outputs the modulated control signal to signal assigner 111.

DL control signal generator 108 generates a control information bit sequence, using information indicating the RBG size for the virtual carrier and the DL resource allocation information inputted from controller 101, and outputs the generated control information bit sequence to encoder 109. Note that, control information is possibly transmitted to multiple terminals, so that DL control signal generator 108 may generate a bit sequence by including the terminal ID of each terminal in the control information for a corresponding one of the terminals.

Encoder 109 applies error correction coding to the control information bit sequence inputted from DL control signal generator 108 and outputs the encoded control signal to modulator 110.

Modulator 110 modulates the control signal inputted from encoder 109 and outputs the modulated control signal to signal assigner 111.

Signal assigner 111 maps the data signal inputted from modulator 104 to a radio resource based on the information on the RBG or the DL resource allocation information inputted from controller 101. Furthermore, signal assigner 111 maps the control signal inputted from modulator 107 or modulator 110 to a radio resource. Signal assigner 111 outputs, to IFFT processor 112, the DL signal in which the signal is mapped.

IFFT processor 112 applies transmission waveform generation processing such as Orthogonal Frequency Division Multiplexing (OFDM) to the signal inputted from signal assigner 111. IFFT processor 112 adds a Cyclic Prefix (CP) in case of OFDM transmission in which a CP is added (not illustrated). IFFT processor 112 outputs the generated transmission waveform to transmitter 113.

Transmitter 113 applies Radio Frequency (RF) processing such as Digital-to-Analog (D/A) conversion and/or up-conversion to the signal inputted from IFFT processor 112 and transmits the radio signal to terminal 200 via antenna 114.

Receiver 115 applies RF processing such as down-conversion or Analog-to-Digital (A/D) conversion to the signal waveform of the CSI feedback signal or SRS received from terminal 200 via antenna 114 and outputs the resultant received signal to FFT processor 116.

FFT processor 116 applies FFT processing for converting a time domain signal to a frequency domain signal to the received signal inputted from receiver 115. FFT processor 116 outputs the frequency domain signal obtained by the FFT processing to extractor 117.

Extractor 117 extracts from the signal inputted from FFT processor 106 the radio resource on which the CSI feedback signal or SRS is transmitted, based on the information (information on CSI feedback or information on SRS) received from controller 101, and outputs a component (CSI feedback signal or SRS signal) of the extracted radio resource to CSI demodulator 118 or SRS measurer 119.

CSI demodulator 118 demodulates the CSI feedback signal inputted from extractor 117 and outputs the demodulated information to controller 101. The CSI feedback, for example, is used in controller 101 for DL assignment control.

SRS measurer 119 measures UL channel quality, using the SRS signal inputted from extractor 117, and outputs the measured information to controller 101. The measured information, for example, is used in controller 101 for UL assignment control (not illustrated).

[Configuration of Terminal]

Figure 4:
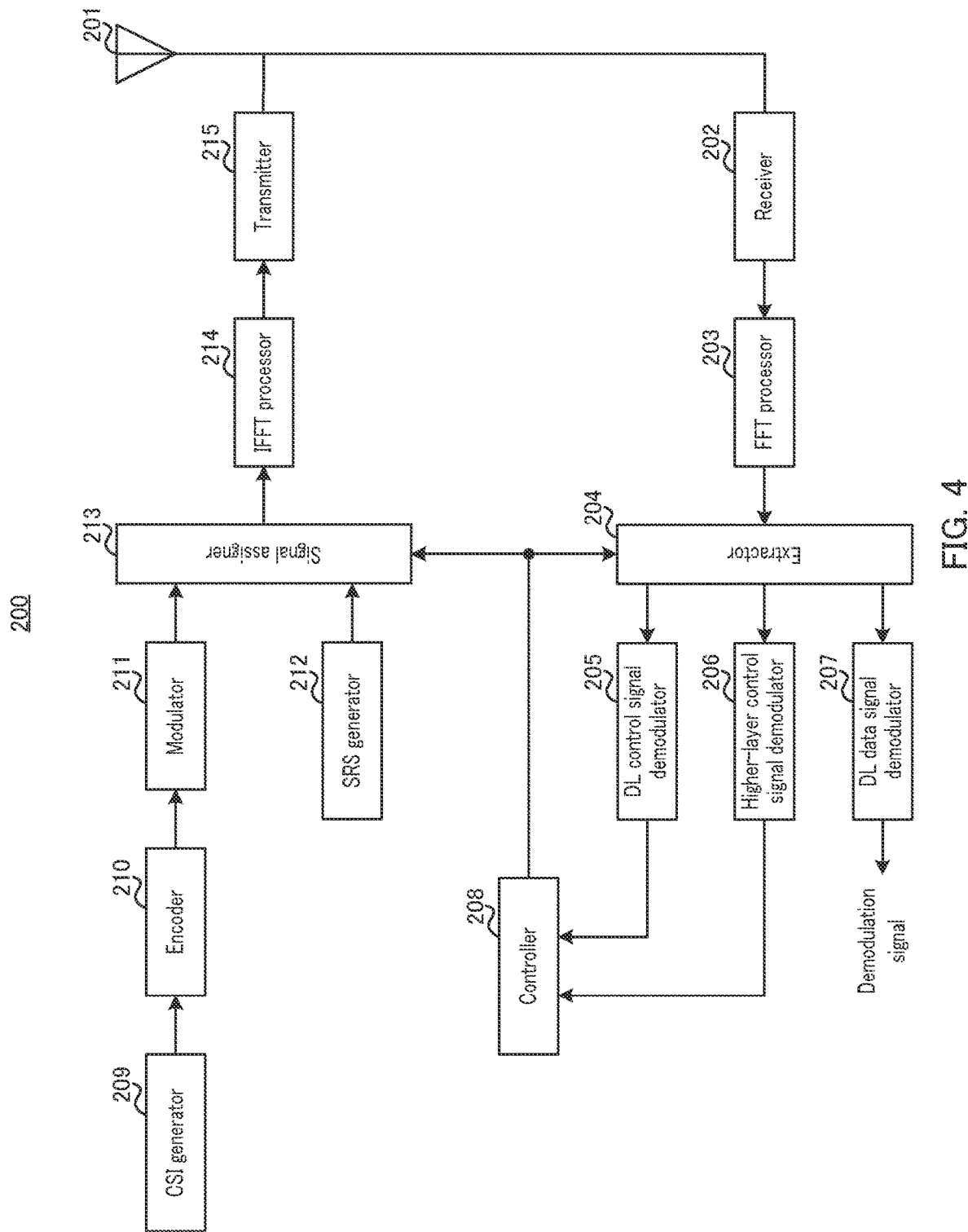
FIG. 4 is a block diagram illustrating a configuration of the terminal according to Embodiment 1.

FIG. 4 is a block diagram illustrating a configuration of terminal 200 according to Embodiment 1 of the present disclosure. In FIG. 4, terminal 200 includes antenna 201, receiver 202, FFT processor 203, extractor 204, DL control signal demodulator 205, higher-layer control signal demodulator 206, DL data signal demodulator 207, controller 208, CSI generator 209, encoder 210, modulator 211, SRS generator 212, signal assigner 213, IFFT processor 214, and transmitter 215.

Receiver 202 applies RF processing such as down-conversion or Analog-to-Digital (A/D) conversion to the signal waveform of the DL signal (data signal and control signal) received from base station 100 via antenna 201 and outputs the resultant received signal (baseband signal) to FFT processor 203.

FFT processor 203 applies FFT processing for converting a time domain signal to a frequency domain signal to the signal (time domain signal) inputted from receiver 201. FFT processor 203 outputs the frequency domain signal obtained by the FFT processing to extractor 204.

Extractor 204 extracts a DL control signal from the signal inputted from FFT processor 203, based on the control information inputted from controller 208, and outputs the DL control signal to DL control signal demodulator 205. Moreover, extractor 204 extracts a higher-layer control signal and DL data signal based on the control information inputted from controller 208 and outputs the higher-layer control signal to higher-layer control signal demodulator 206 and the DL data signal to DL data signal demodulator 207.

DL control signal demodulator 205 blind decodes the DL control signal inputted from extractor 204, and when determining that the DL control signal is the control signal for terminal 200 of DL control signal demodulator 205, DL control signal demodulator 205 demodulates the control signal and outputs the control signal to controller 208.

Higher-layer control signal demodulator 206 demodulates the higher-layer control signal inputted from extractor 204 and outputs the demodulated higher-layer control signal to controller 208.

DL data signal demodulator 207 demodulates the DL data signal inputted from extractor 204 to obtain the demodulation signal.

Controller 208 calculates radio resource allocation for the DL data signal based on the DL resource allocation information indicated by the control signal inputted from DL control signal demodulator 205 and outputs information indicating the calculated radio resource allocation to extractor 204.

Moreover, controller 208 configures, using a method to be described hereinafter, an RBG (RBG size or RBG boundary) for a virtual carrier (second band) based on the DL control signal inputted from DL control signal demodulator 205 or the higher-layer control signal inputted from higher-layer control signal demodulator 206. Controller 208 then outputs information on the configured RBG to extractor 204.

Controller 208 configures a radio resource for a CSI feedback or SRS based on the DL control signal inputted from DL control signal demodulator 205 or the higher-layer control signal inputted from higher-layer control signal demodulator 206 and outputs information on the configured CSI feedback or SRS to signal assigner 213 (details will be given, hereinafter in Embodiments 9 to 12).

CSI generator 209 generates a CSI feedback bit sequence, using the measurement result of the DL channel quality measured in terminal 200, and outputs the CSI feedback bit sequence to encoder 210.

Encoder 210 applies error correction coding to the CSI feedback bit sequence inputted from CSI generator 209 and outputs the encoded CSI signal to modulator 211.

Modulator 211 modulates the CSI signal inputted from encoder 210 and outputs the modulated CSI signal to signal assigner 213.

SRS generator 212 generates an SRS sequence and outputs the SRS sequence to signal assigner 213.

Signal assigner 213 maps the CSI signal inputted from modulator 211 and the SRS sequence inputted from SRS generator 212 to the respective radio resources indicated by controller 208. Signal assigner 213 outputs, to IFFT processor 214, the UL signal in which the signal is mapped.

IFFT processor 214 applies transmission waveform generation processing such as OFDM to the signal inputted from signal assigner 213. In case of OFDM transmission in which a cyclic prefix (CP) is added, IFFT processor 214 adds a CP (not illustrated). Alternatively, when IFFT processor 214 is to generate a single carrier waveform, a discrete Fourier transform (DFT) processor may be added in front of signal assigner 213 (not illustrated). IFFT processor 214 outputs the generated transmission waveform to transmitter 215.

Transmitter 215 applies Radio Frequency (RF) processing such as Digital-to-Analog (D/A) conversion and/or up-conversion to the signal inputted from IFFT processor 214 and transmits the radio signal to base station 100 via antenna 201.

[Operations of Base Station 100 and Terminal 200]

Operations of base station 100 and terminal 200 having the configurations described above will be described in detail, hereinafter.

In this embodiment, base station 100 and terminal 200 determine, for one "virtual carrier (second band)," which is an expanded band containing a first band and a segment after addition of the segment to the first band, a parameter required for communication between base station 100 and terminal 200 in a radio communication system that flexibly supports various bandwidths in LTE-Advanced described above or in a radio communication system that enables flexibly changing the RF bandwidth of terminal 200 in NR.

In LTE-Advanced or NR, OFDM or Single-Carrier Frequency Division Multiple Access (SC-FDMA) is adopted in signal waveforms. These signal waveforms realize multiple-access between a base station and multiple terminals by using a different subcarrier for each of the terminals.

Resource Block (RB) is the minimum unit for radio resource allocation, and in LTE-Advanced or NR, RBs are each composed of 12 subcarriers regardless of subcarrier spacing. However, RBs may be composed of another number of subcarriers rather than 12 subcarriers.

Figure 5:
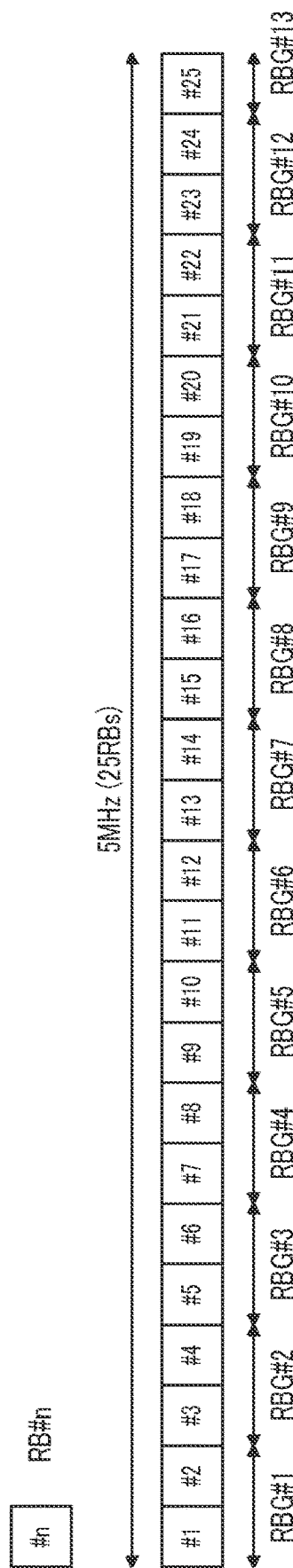
FIG. 5 is a diagram illustrating a configuration example of RBGs.

In LTE-Advanced, as a method of allocating an RB to a terminal for the DL data channel (Physical Downlink Shared Channel (PDSCH)), there is a method using, as the unit, a radio resource set so called resource block group (RBG). RBGs are each composed of contiguous multiple RBs as illustrated in FIG. 5 (two RBs in an example of FIG. 5). In LTE-Advanced, the number of resource blocks (RBG size) P contained in an RBG is configured in accordance with a system bandwidth (e.g., see NPL 5). For example, a base station may indicate PDSCH resource allocation for a terminal, using a DL control signal (DCI) indicating a bitmap in units of RBGs. In this case, as the number of RBGs increases, the number of bits of the DL control signal increases.

In this embodiment, base station 100 and terminal 200 determine, as a parameter for a virtual carrier, an RBG size which is a parameter applied to PDSCH resource allocation. More specifically, base station 100 and terminal 200 determine the RBG size for the virtual carrier based on a bandwidth of the virtual carrier (i.e., sum of the bandwidths of the first band and the segment).

Figure 6:
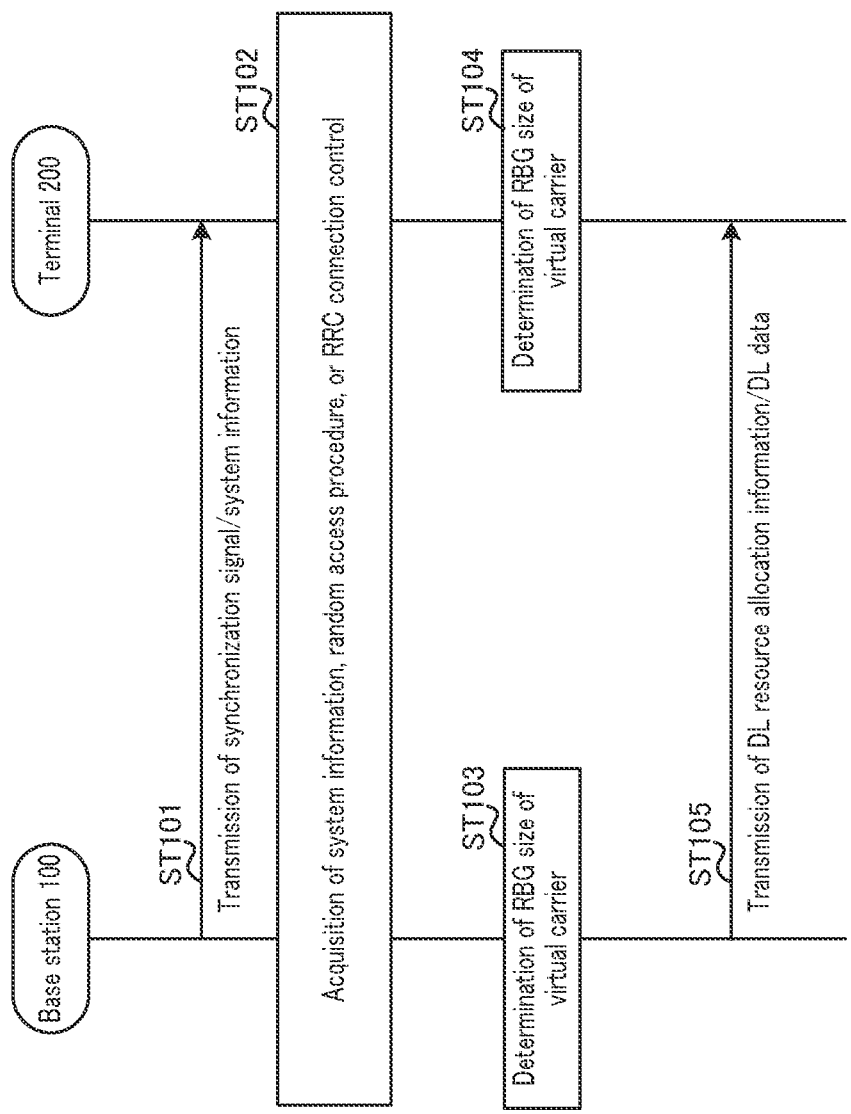
FIG. 6 is a diagram illustrating a flow of an RBG-size determination method according to Embodiment 1.

FIG. 6 illustrates a flow of RBG-size determination processing according to this embodiment.

Base station 100 indicates, to terminal 200, in the first band, a synchronization signal (Primary Synchronization Signal (PSS))/(Secondary Synchronization Signal (SSS)) or system information (Master Information Block (MIB))/(System Information Block (SIB)) (ST101).

Terminal 200 acquires the system information, using the first band, and performs random access procedure or RRC connection control or the like with base station 100 (ST102).

For example, base station 100 may indicate information (e.g., bandwidth) on the first band to terminal 200, using the system information (e.g., MIB). In addition, base station 100 may indicate information (e.g., bandwidth) on the segment (additional band) to terminal 200, using the system information (e.g., SIB) or user-specific Radio Resource Control (RRC) signal. Note that, the number of segments may be more than one.

Note that, the information on the first band and the information on the segment may be indicated from base station 100 to terminal 200, using a method other than the method described above. For example, base station 100 may indicate the information on the segment to terminal 200, using an MIB. At this time, the MIB may be indicated to terminal 200, using the first band or may be indicated to terminal 200, using the segment. In addition, base station 100 may indicate information on the virtual carrier (e.g., sum of the bandwidths of the first band and the segment) to terminal 200. Furthermore, when the first band and the segment are contiguous in the frequency domain, base station 100 may indicate the information on the virtual carrier (e.g., sum of the bandwidths) to terminal 200, and when the first band and the segment are non-contiguous in the frequency domain, base station 100 may indicate the information (e.g., the bandwidth) on the segment to terminal 200, using the system information (e.g., SIB) or the user-specific RRC signal.

Base station 100 may use MAC signaling, an RRC signal, or a DL control signal (Downlink Control Information (DCI)) to indicate the configuration (start and end of using the segment) of the segment to terminal 200.

Next, base station 100 calculates a bandwidth of the virtual carrier, which is an extended band containing a first band and a segment based on the information (bandwidth) on the first band and the information (bandwidth) on the segment (additional band). Base station 100 then determines the RBG size for the virtual carrier based on the calculated bandwidth of the virtual carrier (ST103). Note that, the RBG-size determination method for a virtual carrier will be described in detail, hereinafter.

As in base station 100 (ST101), terminal 200 calculates a bandwidth of a virtual carrier (i.e., sum of the bandwidths of a first band and a segment) based on the information (bandwidth) on the first band and the information (bandwidth) on the segment indicated by base station 100 in ST101. Terminal 200 then determines the RBG size for the virtual carrier based on the calculated bandwidth of the virtual carrier (ST104).

Base station 100 allocates a resource for the DL data (PDSCH) in the virtual carrier with respect to terminal 200, using the determined RBG size, and transmits DL resource allocation information and the DL data (ST105). Terminal 200 identifies the allocated DL resource based on the determined RBG size and receives the DL data.

Figure 7:
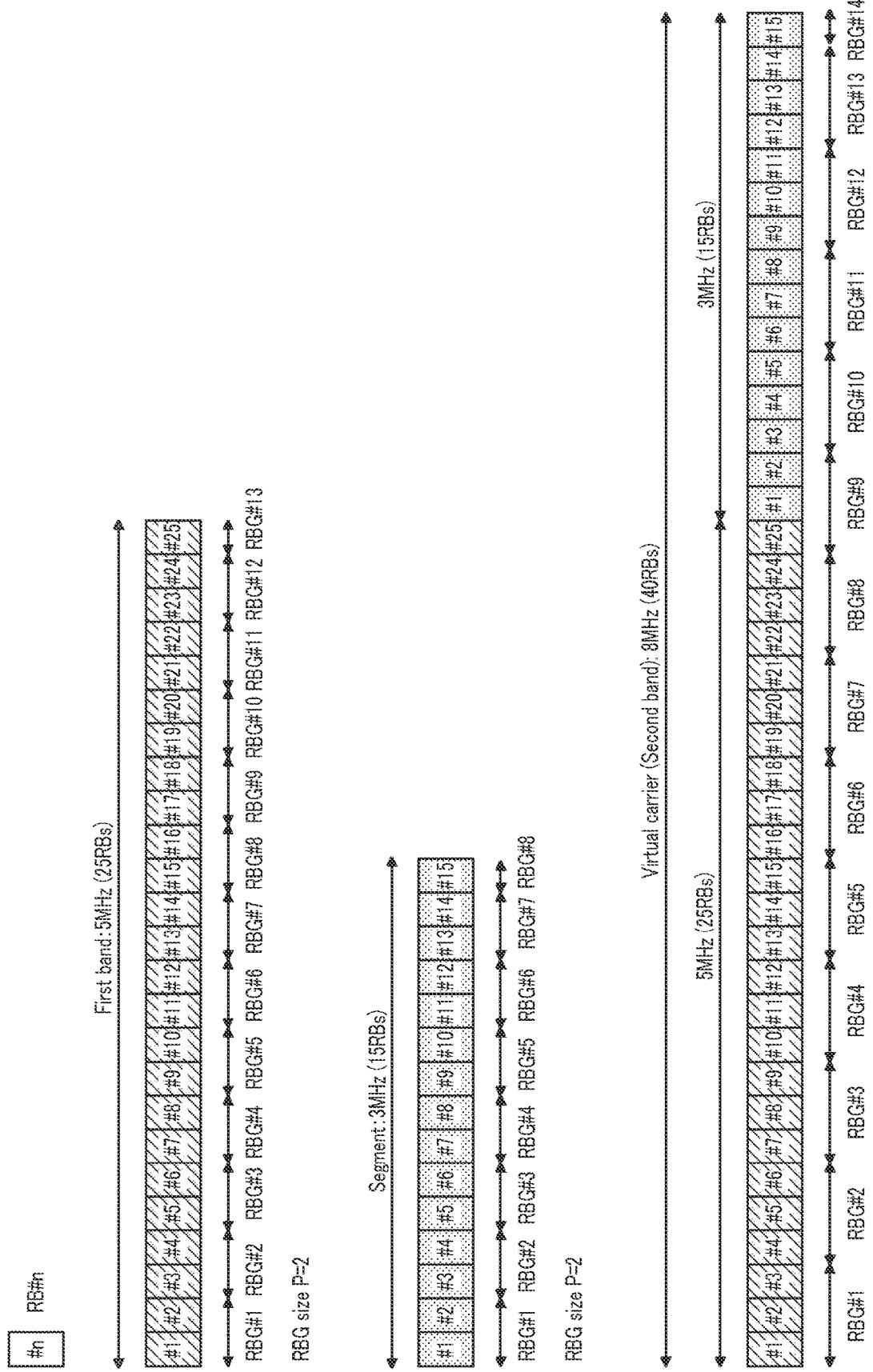
FIG. 7 is a diagram illustrating an example of the RBG-size determination method according to Embodiment 1.
Figure 8:
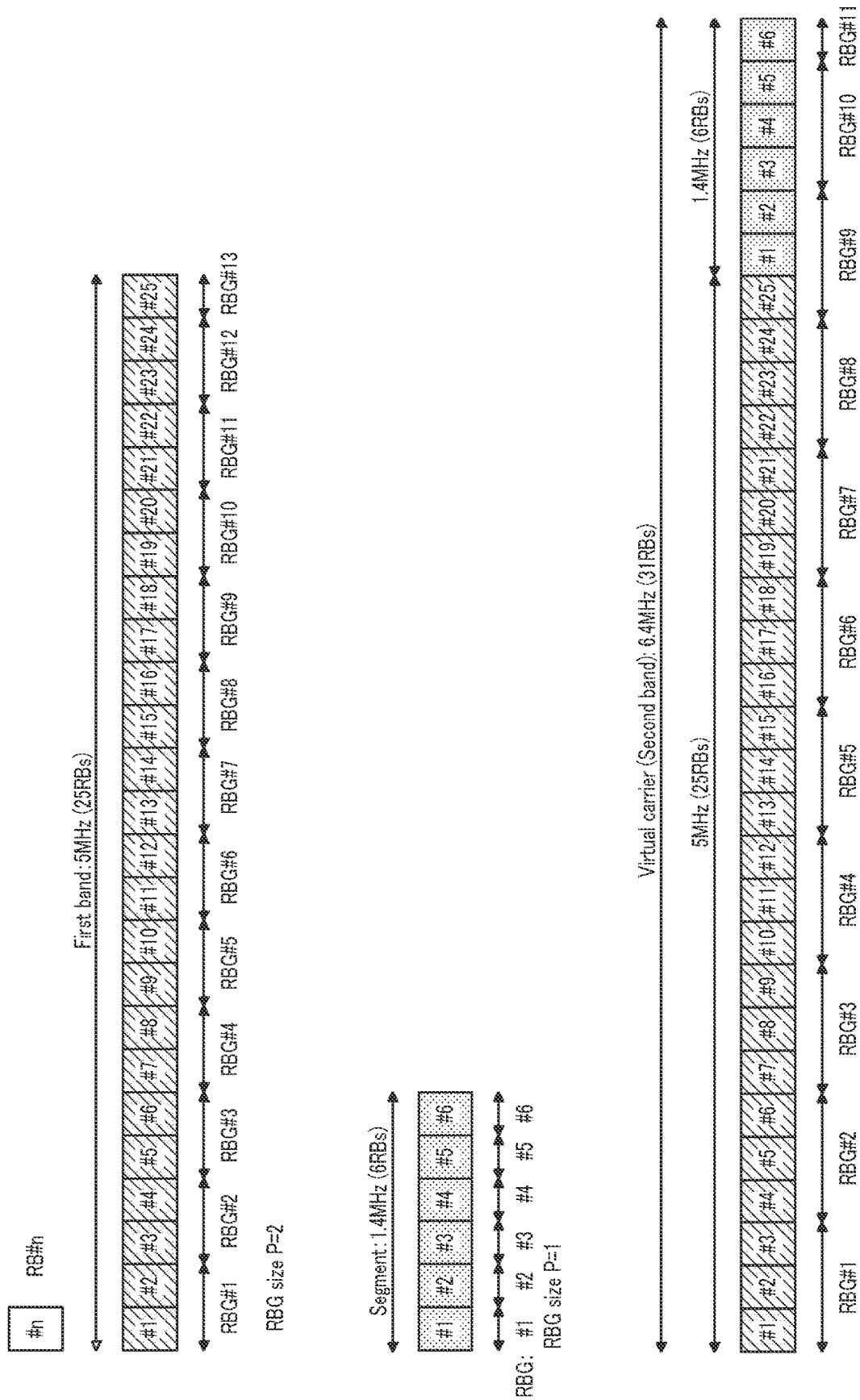
FIG. 8 is a diagram illustrating an example of an RBG-size determination method according to Variation 1 of Embodiment 1.

FIGS. 7 and 8 illustrate an example of the RBG size determination method according to this embodiment.

Note that, hereinafter, a relationship between a system bandwidth and an RBG size similar to that in LTE will be used as an example. More specifically, when the system bandwidth is not greater than 10 RBs, RBG size P=1; when the system bandwidth is between 11 and 26 RBs both inclusive, RBG size P=2; when the system bandwidth is between 27 to 63 RBs both inclusive, RBG size P=3; and when the system bandwidth is between 64 and 110 RBs both inclusive, RBG size P=4 (e.g., see NPL 5). However, the relationship between the system bandwidth and the RBG size is not limited to the relationship similar to that in LTE. Furthermore, only up to 20 MHz (110 RBs) is taken into consideration for the RBG size in LTE, but application of a bandwidth wider than 20 MHz (e.g., 80 MHz) is taken into consideration in NR, so that, for a wide band in which the system bandwidth is greater than 20 MHz, an RBG size greater than RBG size P=4 may be used.

Base station 100 and terminal 200 determine the RBG size for the virtual carrier based on the bandwidth of the virtual carrier (second band) containing the first band and the segment rather than the bandwidth of each of the first band and the segment allocated to terminal 200.

FIG. 7 illustrates an example of a case where the first band is 5 MHz (25 RBs) and the segment is 3 MHz (15 RBs). When data transmission and reception is individually performed in the first band or the segment illustrated in FIG. 7, the RBG sizes of the first band and the segment are P=2 corresponding to 25 RBs and 15 RBs, respectively. Meanwhile, since the bandwidth of the virtual carrier illustrated in FIG. 7 is 8 MHz (40 RBs), when data transmission and reception is performed, using the virtual carrier, the RBG size is P=3 corresponding to 40 RBs.

FIG. 8 illustrates an example of a case where the first band is 5 MHz (25 RBs) and the segment is 1.4 MHz (6 RBs). In a case where individual data transmission and reception is performed in the first band or the segment illustrated in FIG. 8, the RBG size of the first band is P=2 corresponding to 25 RBs and the RBG size of the segment is P=1 corresponding to 6 RBs. Meanwhile, since the bandwidth of the virtual carrier illustrated in FIG. 8 is 6.4 MHz (31 RBs), when data transmission and reception is performed, using the virtual carrier, the RBG size is P=3 corresponding to 31 RBs.

More specifically, in FIGS. 7 and 8, as compared with the case where RBG sizes are determined based on individual bandwidths of the first band and the segment, the RBG size determined based on the virtual carrier containing the first band and the segment becomes large. For this reason, in all the bandwidth of the first band and the segment illustrated in FIG. 7 or 8 (8 MHz or 6.4 MHz), determining the RBG size in units of virtual carriers can reduce the total number of RBGs configured in the virtual carrier.

As described above, according to this embodiment, base station 100 and terminal 200 determine the RBG size for a virtual carrier with a virtual carrier containing a first band and a segment as one unit. Accordingly, the number of RBGs in a virtual carrier can be reduced, so that, in comparison with application of the RBG size of the case where the first band and the segment are individually used, the number of bits required for resource allocation in a DL control signal (DCI) can be reduced, and the overhead for resource allocation can be reduced.

More specifically, according to this embodiment, for example, even in a case where the method of adding a segment is applied in a radio communication system that flexibly supports various bandwidths in LTE-Advanced or in a radio communication system that enables flexibly changing the RF bandwidth of a terminal in NR, a parameter (RBG size, herein) required for an operation in a flexible bandwidth (e.g., virtual carrier) can be appropriately determined.

Variation of Embodiment 1

In Variation 1, base station 100 and terminal 200 calculates a standard bandwidth that is the next larger (higher) bandwidth of the first band and determines the RBG size for the virtual carrier (second band).

The term "standard bandwidth" herein refers to 1.4 MHz, 3 MHz, 5 MHz, 10 MHz, 15 MHz, and 20 MHz in LTE-Advanced. Note that, the standard bandwidth is not limited to the values mentioned above, and another standard bandwidth may be defined.

Figure 9:
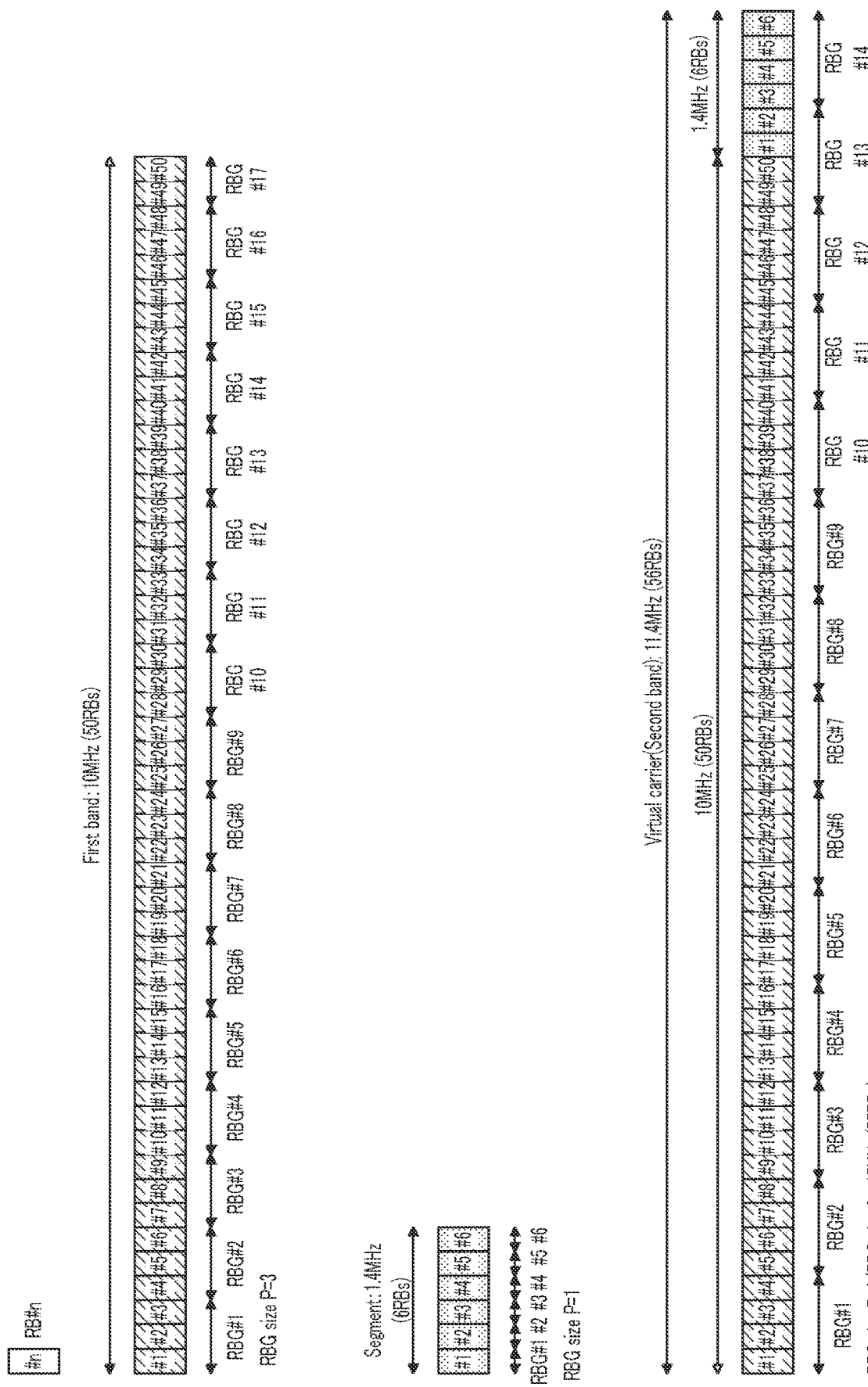
FIG. 9 is a diagram illustrating an example of an RBG-size determination method according to Variation 2 of Embodiment 1.

For example, in FIG. 9, the standard bandwidth that is the next larger (higher) bandwidth (10 MHz: 50 RBs) of the first band is 15 MHz (75 RBs). Accordingly, base station 100 and terminal 200 determine the RBG size for the virtual carrier containing of the first band of 10 MHz and the segment to be P=4 corresponding to 15 MHz.

Accordingly, for example, even when the information (bandwidth) on the first band and the information (bandwidth) on the segment are indicated separately to terminal 200, terminal 200 can determine the RBG size for the virtual carrier from the bandwidth of the first band. More specifically, according to Variation 1, the RBG-size determination method can be simplified.

Variation 2 of Embodiment 1

In Variation 2, base station 100 and terminal 200 calculate a standard bandwidth having the smallest bandwidth among the standard bandwidths larger (higher) than the bandwidth of the virtual carrier (second band) and determine the RBG size for the virtual carrier.

For example, the standard bandwidth having the smallest bandwidth among the standard bandwidths larger (higher) than the bandwidth (11.4 MHz (56 RBs)) of the virtual carrier illustrated in FIG. 9 is 15 MHz (75 RBs). Accordingly, base station 100 and terminal 200 determine the RBG size for the virtual carrier to be P=4 corresponding to 15 MHz.

Accordingly, base station 100 and terminal 200 determine the RBG size for the virtual carrier to be similar to the standard bandwidth approximate to the bandwidth of the virtual carrier, thereby making it possible to simplify the RBG-size determination method.

Moreover, according to Variations 1 and 2 of Embodiment 1, by configuring the bandwidth for resource allocation to be similar to the standard bandwidth used in determining the RBG, the resource allocation region in a DCI can be the same as the standard bandwidth, so that decoding of the DCI in terminal 200 can be simplified.

Embodiment 2

While the case where the RBG size of a virtual carrier (second band) is determined based on the bandwidth of the virtual carrier is described in Embodiment 1, a case where the RBG size of a virtual carrier is determined based on the RBG size of a first band (e.g., BCC) will be described in Embodiment 2.

When a terminal performing data transmission and reception using a first band and a terminal performing data transmission and reception using a virtual carrier both exist in the same resource, there is a possibility that the resource cannot be used efficiently.

Figure 10:
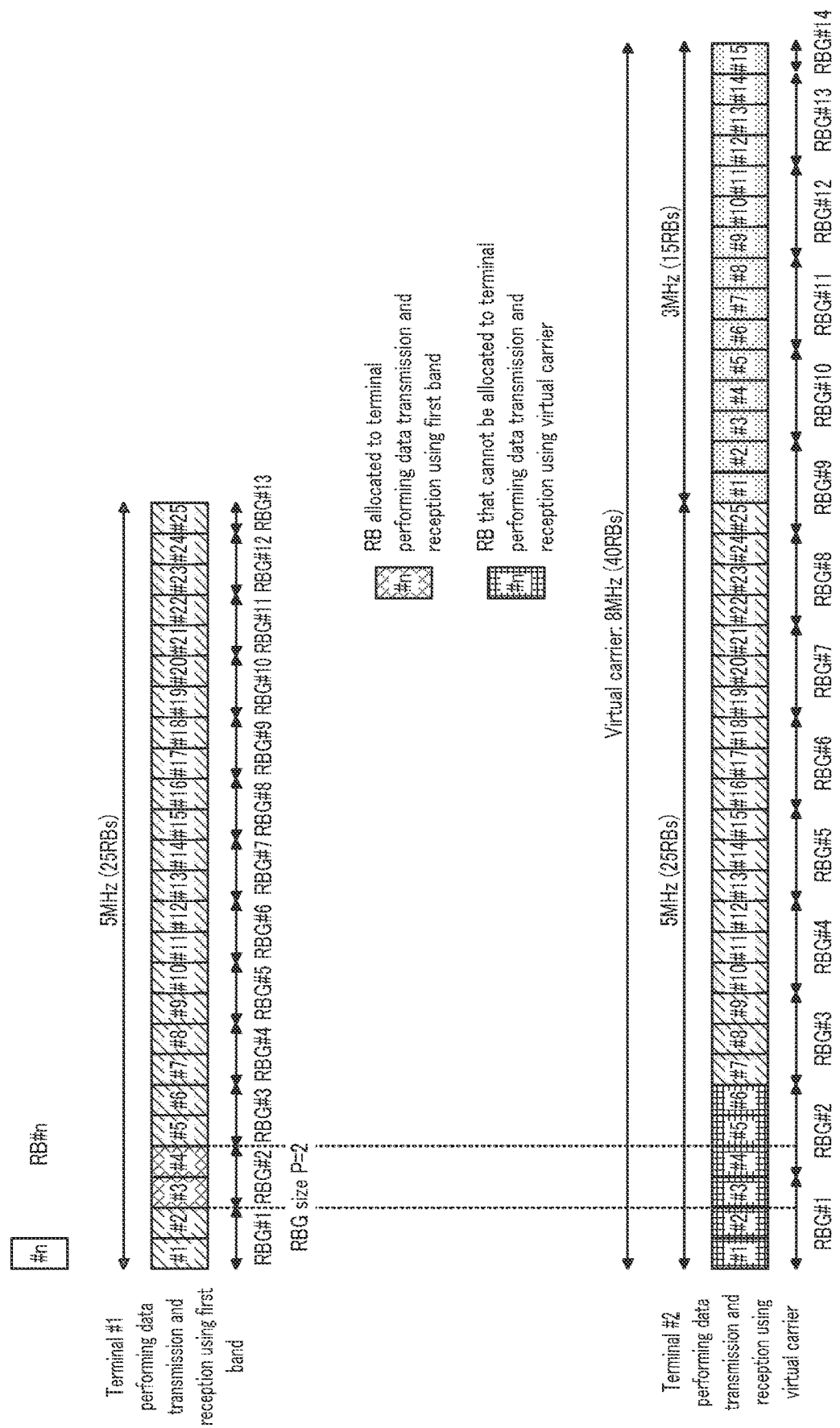
FIG. 10 is a diagram provided for describing a problem of Embodiment 2.

FIG. 10 illustrates an example in which the first band is 5 MHz (25 RBs) and the segment is 3 MHz (15 RBs). Note that, in FIG. 10, as in Embodiment 1, an assumption is made that an RBG is determined in accordance with a system bandwidth.

In FIG. 10, when individual data transmission and reception is performed using the first band or the segment, the RBG sizes of the first band and the segment are each P=2. Meanwhile, the bandwidth of the virtual carrier is 8 MHz (40 RBs), so that, when data transmission and reception is performed using the virtual carrier, the RBG size of the virtual carrier is P=3.

At this time, as illustrated in FIG. 10, when a terminal performing data transmission and reception using the first band (hereinafter, referred to as "terminal #1") and a terminal performing data transmission and reception using the virtual carrier (hereinafter, referred to as "terminal #2") both exist, allocation of RBG #2 (RBs #3 and #4) to terminal #1 makes it impossible to allocate RBG #1 (RBs #1 to #3) and RBG #2 (RBs #4 to #6) containing RBs #3 and #4 to terminal #2. In other words, in FIG. 10, one RBG allocated to terminal #1 is configured over the resources corresponding to two RBGs for terminal #2, so that the resource allocation efficiency for terminal #2 is deteriorated.

In this respect, in this embodiment, the RBG size for a virtual carrier is determined taking into consideration the RBG size of the first band.

A base station and a terminal according to Embodiment 2 have basic configurations common to base station 100 and terminal 200 according to Embodiment 1, so that a description will be given while FIGS. 3 and 4 are incorporated herein.

Note that, the method of indicating the information (bandwidth) on the first band and the information (bandwidth) on the segment (additional band) from base station 100 to terminal 200 and the method of configuring (start and end of using) the segment for terminal 200 by base station 100 are similar to those in Embodiment 1, so that their descriptions will not be repeated, hereinafter.

Base station 100 according to this embodiment calculates the bandwidth of a virtual carrier (i.e., sum of the bandwidths of a first band and a segment) based on information (bandwidth) on the first band and information (bandwidth) on the segment (additional band). In addition, terminal 200 calculates the bandwidth of the virtual carrier (second band) based on the information (bandwidth) on the first band and the information (bandwidth) on the segment, which are indicated by base station 100.

Moreover, in this embodiment, base station 100 and terminal 200 determine X times (provided that "X" is an integer equal to or greater than two) of an RBG size configured based on the bandwidth of the first band to be the RBG size configured for the virtual carrier. Note that, information on X may be indicated from base station 100 to terminal 200, or X may be a value defined by the standard.

Figure 11:
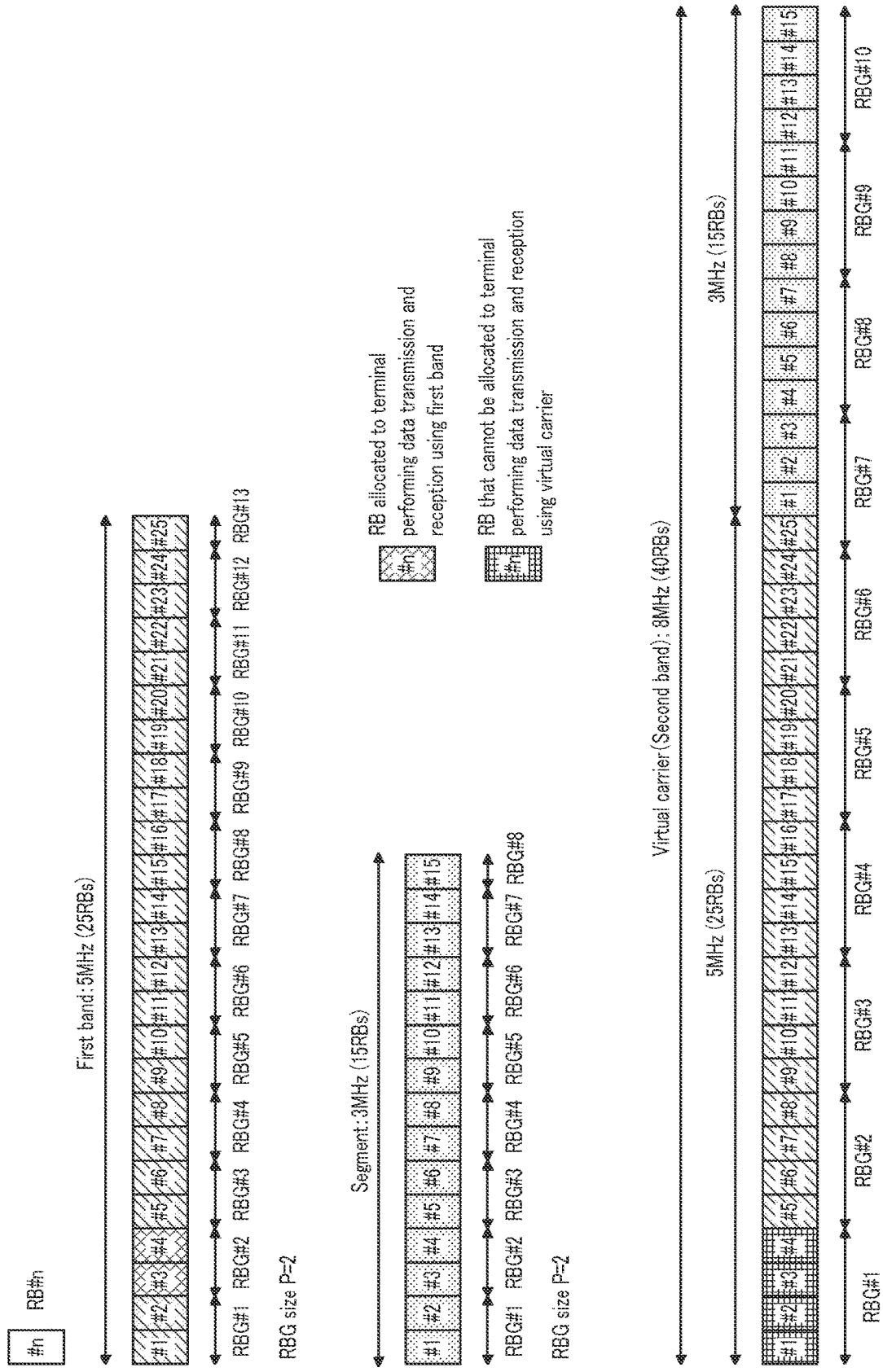
FIG. 11 is a diagram illustrating an example of an RBG-size determination method according to Embodiment 2.

FIG. 11 illustrates an example of an RBG-size determination method according to this embodiment.

FIG. 11 illustrates an example of a case where the first band is 5 MHz (25 RBs) and the segment is 3 MHz (15 RBs), and the bandwidth of the virtual carrier is 8 MHz (40 RBs). When individual data transmission and reception is performed in the first band or the segment illustrated in FIG. 11, the RBG sizes of the first band and the segment are P=2 corresponding to 25 RBs and 15 RBs, respectively.

In FIG. 11, suppose that X=2. Accordingly, the RBG size of a case where data transmission and reception is performed using the virtual carrier illustrated in FIG. 11 is P=4, which is X times of RBG size P=2 configured based on the bandwidth of the first band. In this manner, a boundary (range) between RBGs configured for the virtual carrier coincides with a boundary between RBGs configured based on the bandwidth of the first band. Thus, base station 100 can efficiently perform resource allocation for terminal 200 performing data transmission and reception using the virtual carrier.

For example, in FIG. 11, suppose that, when a terminal performing data transmission and reception using the first band and a terminal performing data transmission and reception using the virtual carrier both exist in the same resource, RBG #2 (RBs #3 and #4) is allocated to the terminal performing data transmission and reception using the first band. In this case, base station 100 cannot allocate RBG #1 (RB s #1 to #4) containing RBs #3 and #4 to the terminal performing data transmission and reception using the virtual carrier. In other words, while the number of RBGs that cannot be allocated to the terminal performing data transmission and reception using the virtual carrier because of one RBG allocated to the terminal performing data transmission and reception using the first band is two in the example illustrated in FIG. 10, the number of RBGs that cannot be allocated can be only one in this embodiment (FIG. 11).

As described above, in this embodiment, configuring the RBG size of a virtual carrier to be an integral multiple of the RBG size configured based on the bandwidth of a first band makes it possible to prevent the RBG allocated to a terminal performing data transmission and reception using the first band from being configured over multiple RBGs for a terminal performing data transmission and reception using the virtual carrier. Accordingly, the terminal performing data transmission and reception using the first band and the terminal performing data transmission and reception using the virtual carrier can be efficiently multiplexed.

Moreover, according to this embodiment, an RBG size greater than the RBG size of the first band can be configured for the virtual carrier. Accordingly, as in Embodiment 1, when a virtual carrier is used, the number of RBGs for the virtual carrier can be reduced compared with the case where the RBG size of the first band is applied without any change, so that the number of bits required for resource allocation in a DL control signal (DCI) can be reduced, and the overhead for resource allocation can be reduced.

Embodiment 3

Figure 12:
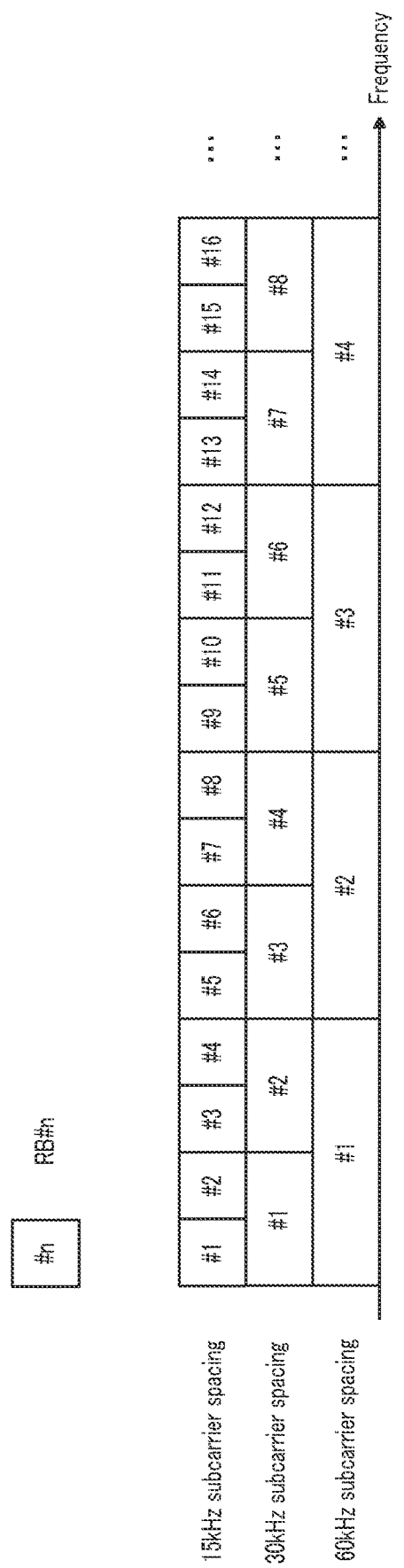
FIG. 12 is a diagram illustrating an example of an RB grid between numerologies having different subcarrier spacings.

In NR, as a method of enabling terminals under services with different requirements to be covered, "mixed numerology" has been studied, which allows signal waveforms with different subcarrier spacings and/or the like to exist within the same band. In addition, in NR, studies have been conducted on configuring an RB with 12 subcarriers regardless of subcarrier spacing. Moreover, in 3GPP, when FDM is applied to numerology having different subcarrier spacings, an agreement has been made that an RB grid of subcarrier spacings adopts a "nested structure" as illustrated in FIG. 12. Note that, the assignment of RB numbers illustrated in FIG. 12 is only exemplary and not limited to this example.

Figure 13:
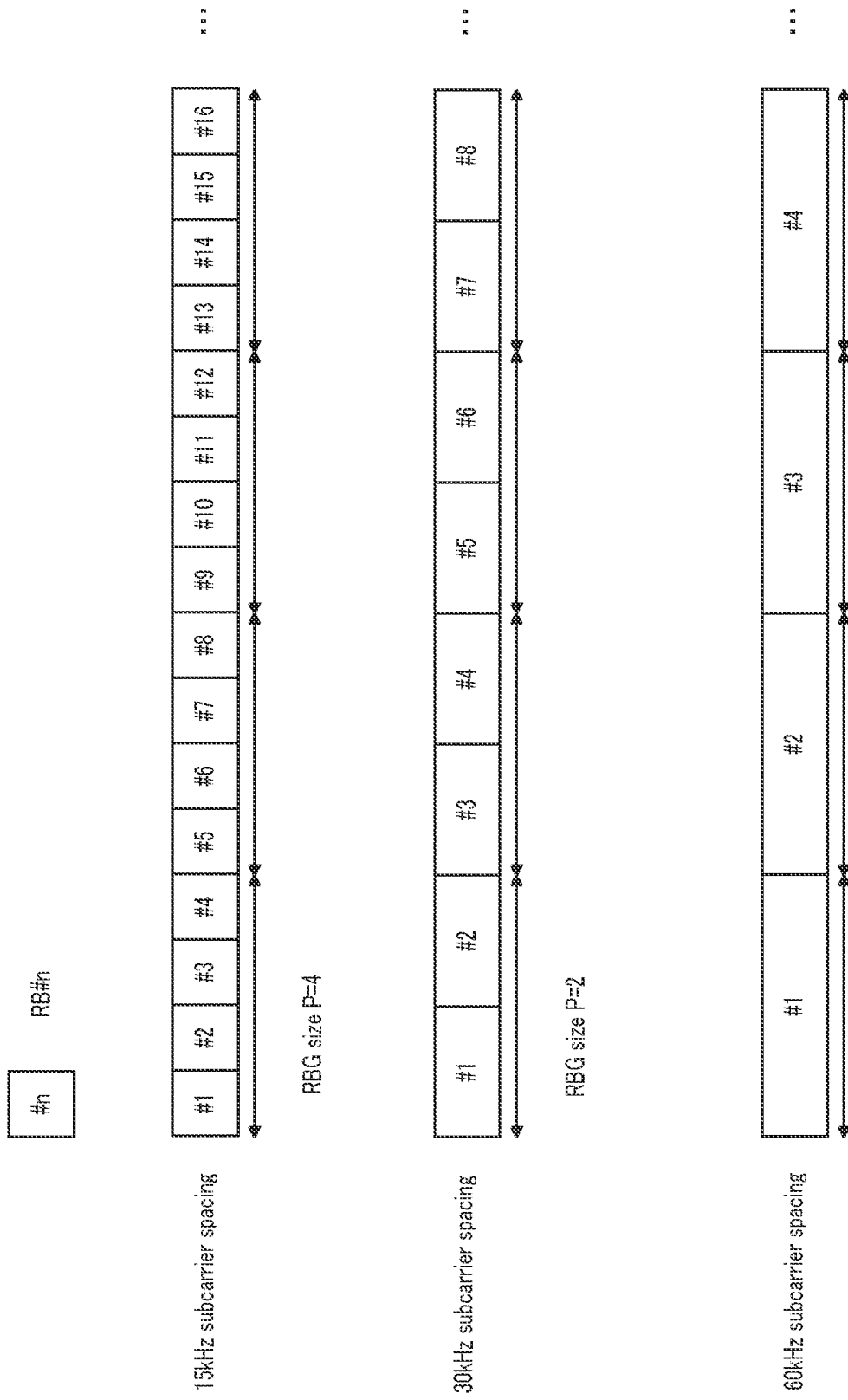
FIG. 13 is a diagram illustrating an example of an RB grid and RBGs between numerologies having different subcarrier spacings.

Moreover, FIG. 13 illustrates an example of an RB grid when terminals with subcarrier spacings of 15 kHz, 30 kHz, and 60 kHz are multiplexed. As illustrated in FIG. 13, when terminals with different subcarrier spacings exist in a mixed manner, setting the RBG sizes to be a power-of-two makes it possible to align boundaries (ranges) between RBGs with boundaries of the RB grid even between numerologies of different subcarrier spacings. Thus, the resources can be efficiently used in this case.

In this respect, the RBG size for a virtual carrier is configured to be a power-of-two in this embodiment.

A base station and a terminal according to Embodiment 3 have basic configurations common to base station 100 and terminal 200 according to Embodiment 1, so that a description will be given while FIGS. 3 and 4 are incorporated herein.

Note that, the method of indicating the information (bandwidth) on the first band and the information (bandwidth) on the segment (additional band) from base station 100 to terminal 200 and the method of configuring (start and end of using) the segment for terminal 200 by base station 100 are similar to those in Embodiment 1, so that their descriptions will not be repeated, hereinafter.

Base station 100 according to this embodiment calculates the bandwidth of a virtual carrier (i.e., sum of the bandwidths of a first band and a segment) based on information (bandwidth) on the first band and information (bandwidth) on the segment (additional band). In addition, terminal 200 calculates the bandwidth of the virtual carrier (second band) based on the information (bandwidth) on the first band and the information (bandwidth) on the segment, which are indicated by base station 100.

Moreover, in this embodiment, base station 100 and terminal 200 determine a power-of-two to be the RBG size configured for the virtual carrier. Note that, information on the RBG size (e.g., power-of-two; a value of "n" for $2^n$) may be indicated from base station 100 to terminal 200, or a value defined by the standard may be used. Moreover, as in Embodiment 1, the RBG size (e.g., power-of-two; a value of "n" for $2^n$) may be calculated from the bandwidth of the virtual carrier.

Figure 14:
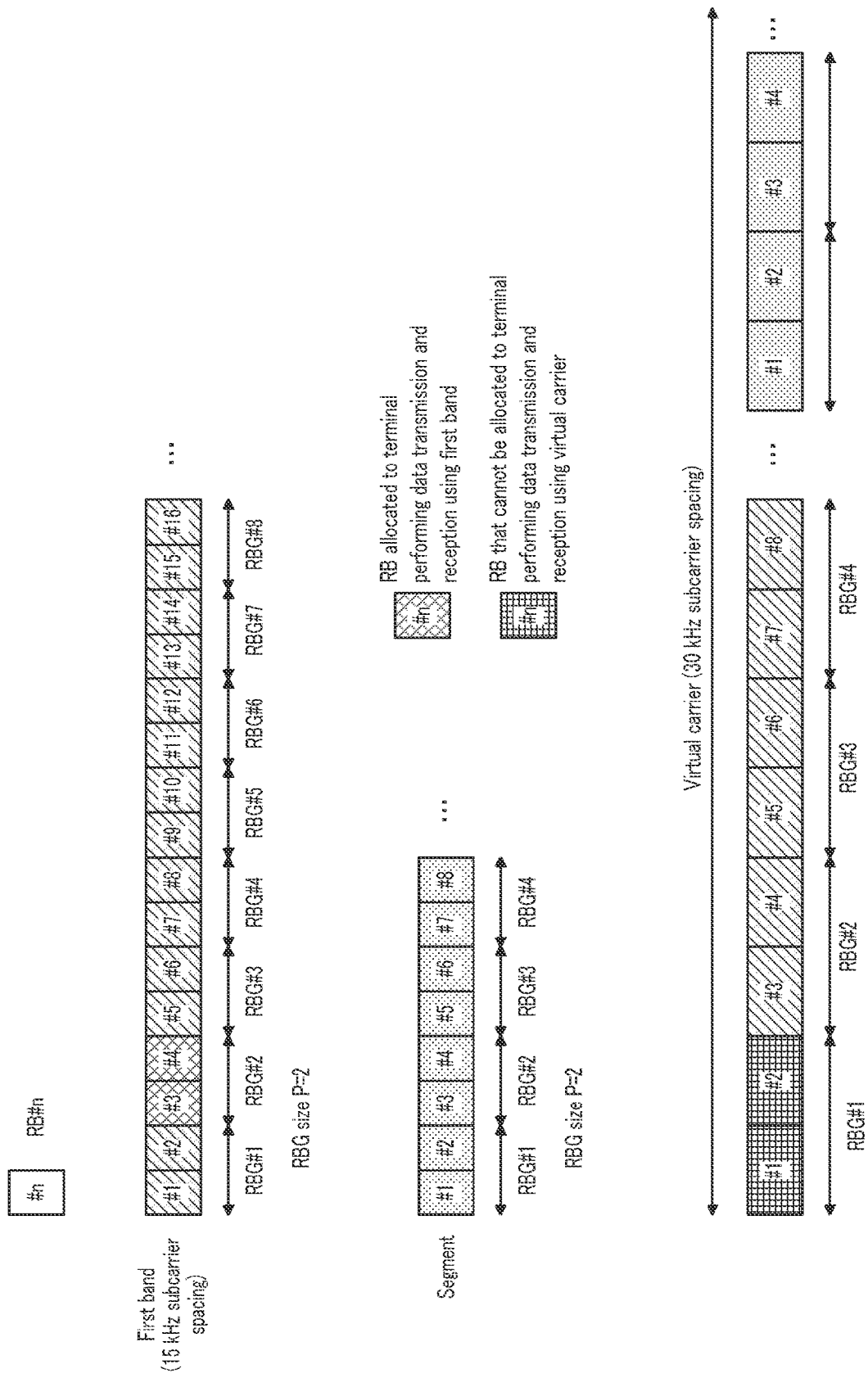
FIG. 14 is a diagram illustrating an example of an RBG-size determination method according to Embodiment 3.

FIG. 14 illustrates an example of an RBG-size determination method according to this embodiment.

FIG. 14 illustrates an example of a case where the RBG size of the first band with 15 kHz subcarrier spacing is P=2, and the RBG size of the virtual carrier with 30 kHz subcarrier spacing is P=2. In other words, in FIG. 14, the RBG size of the virtual carrier is two to the power of one. Accordingly, boundaries (ranges) between RBGs configured for the virtual carrier coincide with boundaries between RBGs configured based on the bandwidth of the first band. Thus, base station 100 can efficiently perform resource allocation for terminal 200 performing data transmission and reception using the virtual carrier.

For example, in FIG. 14, suppose that, when a terminal performing data transmission and reception using the first band and a terminal performing data transmission and reception using the virtual carrier both exist in the same resource, RBG #2 (RBs #3 and #4) is allocated to the terminal performing data transmission and reception using the first band. In this case, base station 100 cannot allocate RBG #1 (RBs #1 and #2) containing the same resources as RBs #3 and #4 in 15 kHz subcarrier spacing to the terminal performing data transmission and reception using the virtual carrier. In other words, as illustrated in FIG. 14, the number of RBGs that cannot be allocated to the terminal performing data transmission and reception using the virtual carrier can be only one.

As described above, in this embodiment, configuring the RBG size of a virtual carrier to be a power-of-two makes it possible to align the boundaries of RBGs with each other between terminals even when terminals with different subcarrier spacings exist in a mixed manner. Thus, multiple terminals with different subcarrier spacings can be efficiently multiplexed.

More specifically, according to this embodiment, for example, even when terminals with different subcarrier spacings exist in a mixed manner in a radio communication system that flexibly supports various bandwidths in LTE-Advanced or in a radio communication system that enables flexibly changing the RF bandwidth of a terminal in NR, for example, a parameter (RBG size, herein) required for an operation in a flexible bandwidth (e.g., virtual carrier) can be appropriately determined.

Embodiment 4

A base station and a terminal according to Embodiment 4 have basic configurations common to base station 100 and terminal 200 according to Embodiment 1, so that a description will be given while FIGS. 3 and 4 are incorporated herein.

Note that, the method of indicating the information (bandwidth) on the first band and the information (bandwidth) on the segment (additional band) from base station 100 to terminal 200 and the method of configuring (start and end of using) the segment for terminal 200 by base station 100 are similar to those in Embodiment 1, so that their descriptions will not be repeated, hereinafter.

In this embodiment, a description will be given of a case where the configuration of an RBG size for a virtual carrier (second band) is adaptively changed by signaling from base station 100 to terminal 200.

Controller 101 of base station 100, for example, variably configures the RBG size for a virtual carrier in accordance with a communication state of terminal 200. For example, when a terminal performing data transmission and reception using the first band and a terminal performing data transmission and reception using the virtual band need to be multiplexed, base station 100 determines the RBG size of the virtual carrier to be the same as that of the first band, or an integral multiple of the first band, or a power-of-two (e.g., see Embodiments 2 and 3). Meanwhile, when multiplexing of the terminal performing data transmission and reception using the first band is not required, base station 100 may determine the RBG size of the virtual carrier to be a value other than a value of integral multiple of the first band (or the same value as that of the first band).

Base station 100 indicates information (information on change in configuration) on the RBG size for the virtual carrier to terminal 200, using a higher-layer control signal (e.g., system information (MIB or SIB) or RRC signal)).

Terminal 200 receives the higher-layer control signal indicated by base station 100 and identifies the RBG size for the virtual carrier based on the received higher-layer control signal.

Figure 15:
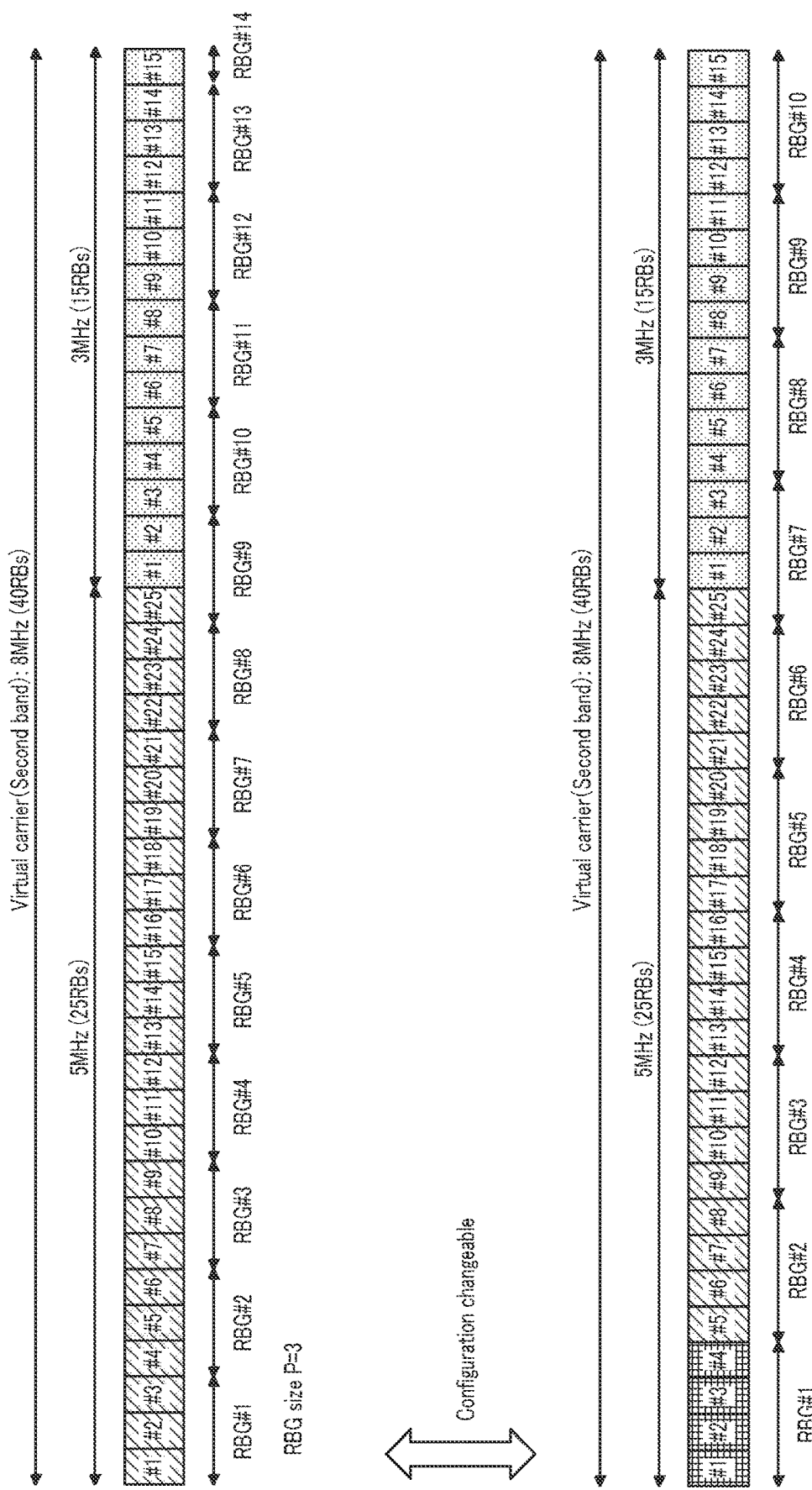
FIG. 15 is a diagram illustrating an example of an RBG-size determination method according to Embodiment 4.

FIG. 15 illustrates an example of an RBG-size determination method according to this embodiment. FIG. 15 illustrates an example in which the RBG size of the virtual carrier is configurable with P=3 or P=4.

For example, in FIG. 15, when a terminal performing transmission and reception using a first band of RBG size P=2 (e.g., see FIG. 10) and a terminal performing transmission and reception using a virtual carrier exist in a mixed manner, base station 100 may indicate, to the terminal performing transmission and reception using the virtual carrier, an RBG size of P=4 (or the second power of two), which is twice of RBG size P=2, as illustrated in the lower diagram in FIG. 15. Accordingly, base station 100 can efficiently multiplex the terminal performing data transmission and reception using the first band and the terminal performing data transmission and reception using the virtual carrier as in Embodiments 2 and 3.

Meanwhile, when there is no terminal performing data transmission and reception using a first band to be multiplexed with a terminal performing data transmission and reception using a virtual carrier, base station 100 may indicate RBG size P=3 to the terminal performing data transmission and reception using the virtual carrier. Accordingly, for example, as in Embodiment 1 (see FIG. 7), an RBG size in accordance with the bandwidth of the virtual carrier is determined, and resource allocation can be flexibly performed while the overhead for the resource allocation is reduced.

As described above, according to this embodiment, the RBG size configured for a virtual carrier is variable and is indicated to terminal 200 from base station 100 by signaling (e.g., system information (MIB or SIB) or RRC signal). Accordingly, for example, according to whether multiplexing of a terminal performing data transmission and reception using a first band and a terminal performing data transmission and reception using a virtual carrier is necessary or not, the RBG size of the virtual carrier with respect to terminal 200 can be adaptively changed.

Note that, even when the RBG size is indicated by the system information (e.g., MIB or SIB), terminal 200 may reconfigure the RBG size by an RRC signal.

Alternatively, when the RBG size is indicated by an RRC signal, terminal 200 may use a default RBG size until reception of the RRC signal. The default RBG size may be indicated by system information or may be determined by a method similar to those in Embodiments 1 to 3.

Embodiment 5

In this embodiment, a description will be given of a method of determining an RB forming an RBG which is a parameter applied to resource allocation for DL data channel (PDSCH).

A base station and a terminal according to Embodiment 5 have basic configurations common to base station 100 and terminal 200 according to Embodiment 1, so that a description will be given while FIGS. 3 and 4 are incorporated herein.

Note that, the method of indicating the information (bandwidth) on the first band and the information (bandwidth) on the segment (additional band) from base station 100 to terminal 200 and the method of configuring (start and end of using) the segment for terminal 200 by base station 100 are similar to those in Embodiment 1, so that their descriptions will not be repeated, hereinafter. Moreover, the RBG-size determination method according to any of Embodiments 1 to 4 may be used.

Figure 16:
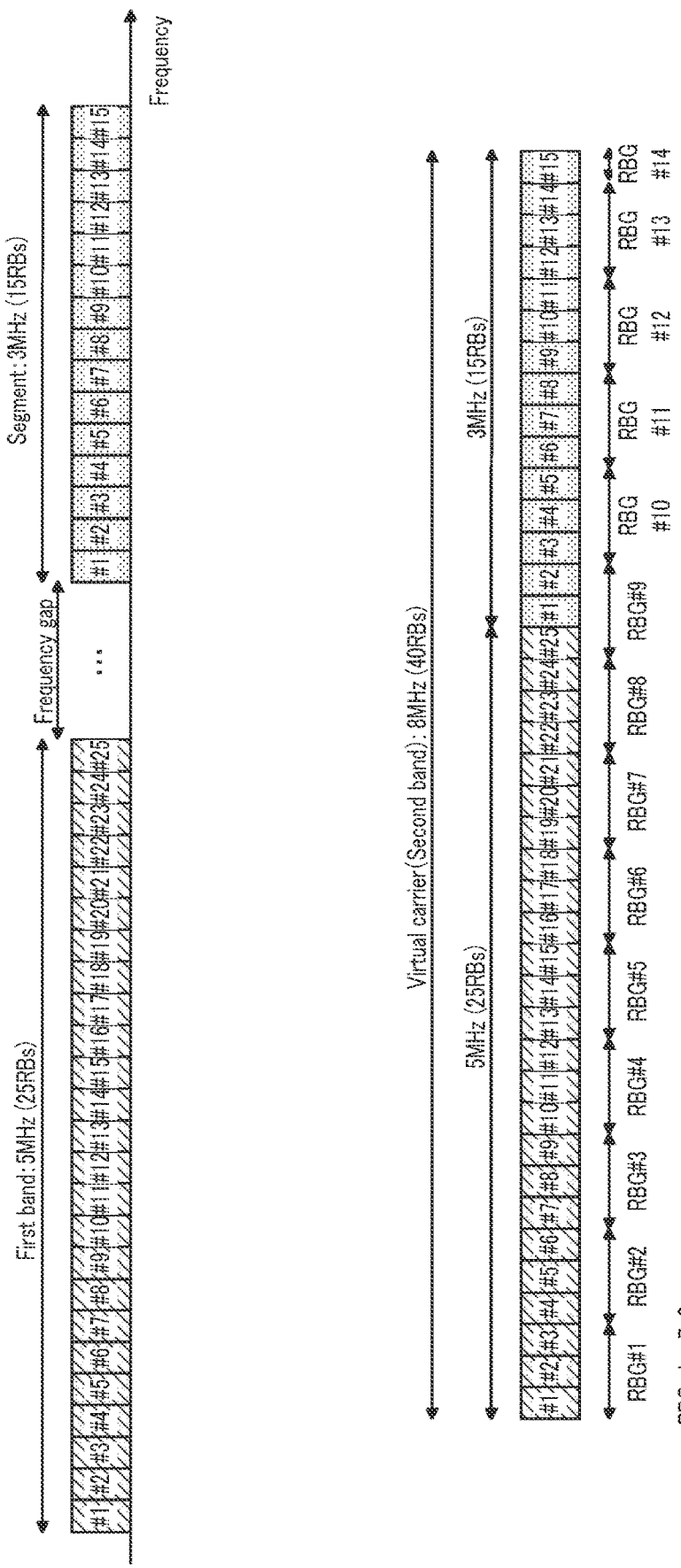
FIG. 16 is a diagram illustrating an RBG configuration example of a case where a first band and a segment are non-contiguous in the frequency domain.

As described in Embodiments 1 to 4, when an RBG size is determined while a band containing a first band and a segment is regarded as one virtual carrier (second band), as illustrated in FIG. 16, there is a possibility that an RBG containing both an RB of the first band and an RB of the segment (RBG #9 in FIG. 16) is configured. At this time, as illustrated in FIG. 16, when the first band and the segment are non-contiguous in the frequency domain (when a gap exists in the frequency domain), multiple RBs with different channel states are treated as one RBG (RBG #9). For this reason, it is predicted that scheduling, precoding configuration, channel estimation accuracy, and/or the like for this RBG is negatively affected.

In this respect, in Embodiment 5, a description will be given of a case where RBs forming one RBG include only RBs of a first band or only RBs of a segment. In other words, in this embodiment, base station 100 and terminal 200 configure an RBG in such a way that a boundary (range) between RBGs configured for a virtual carrier coincides with a boundary between the first band and the segment contained in the virtual carrier.

Figure 17:
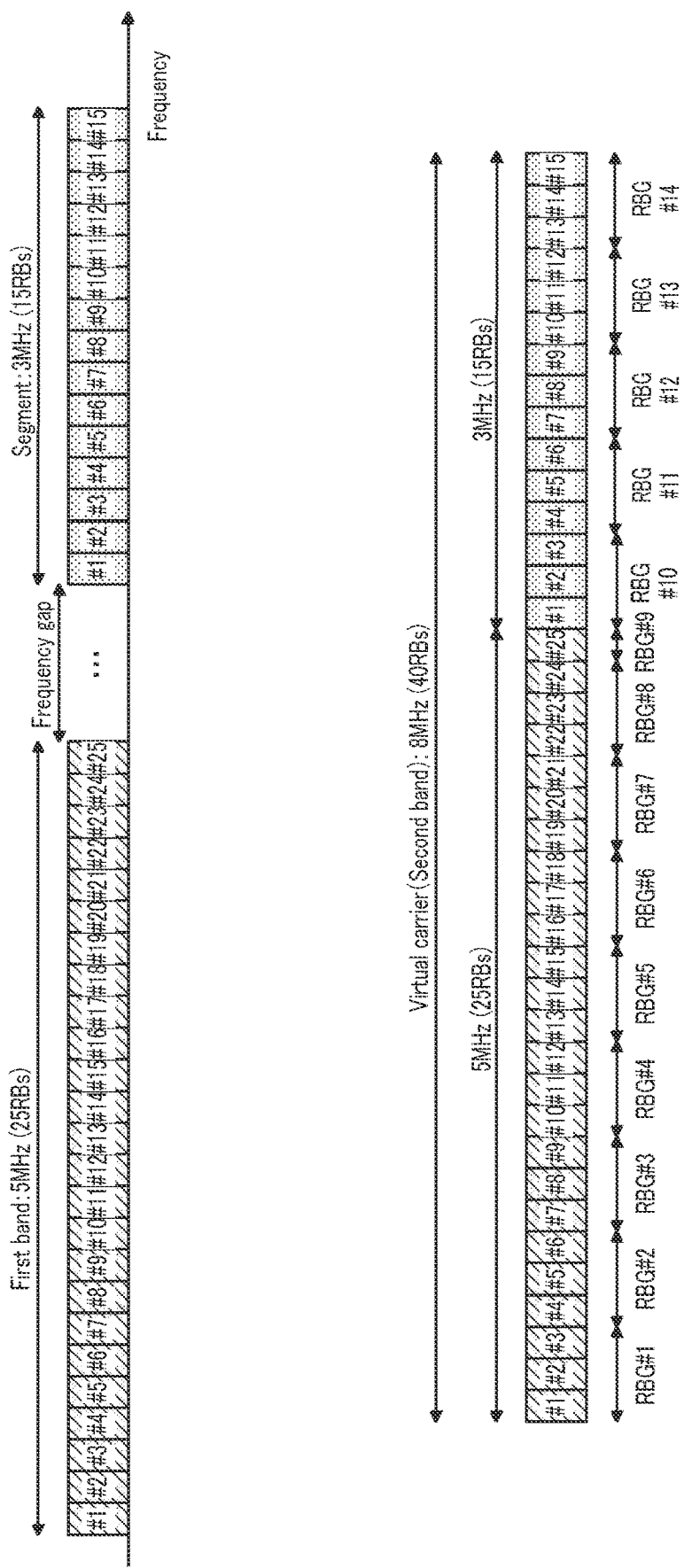
FIG. 17 is a diagram illustrating an example of an RBG-size determination method according to Embodiment 5.

FIG. 17 illustrates an example of an RBG determination method according to this embodiment. In FIG. 17, an assumption is made that RBG size P=3.

In FIG. 17, the first band and the segment are non-contiguous in the frequency domain. Moreover, in FIG. 17, RBGs #1 to #9 are composed of an RB or RBs (RBs #1 to #25) of the first band and RBGs #10 to #14 are composed of RBs (RBs #1 to #15) of the segment.

As illustrated in FIG. 17, in the vicinity of the boundary between the first band and the segment in the virtual carrier, RBG #9 is composed of one RB of the first band, which is RB #25, and RBG #10 is composed of three RBs of the segment, which are RBs #1 to #3. More specifically, in FIG. 17, the boundary between the RBGs at least coincides with the boundary between the first band and the segment. Stated differently, in FIG. 17, there is no RBG composed of both resource blocks of the first band and the segment that are non-contiguous in the frequency domain. Accordingly, since the RBs in each RBG illustrated in FIG. 17 are contiguous in the frequency domain, their channel states are similar to each other.

Accordingly, in this embodiment, even when the first band and the segment are non-contiguous in the frequency domain, the impact caused by a gap in the frequency domain on scheduling, precoding configuration, channel estimation accuracy, and/or the like for the RBG configured in the virtual carrier can be suppressed.

Embodiment 6

In this embodiment, a description will be given of a method of determining an RB forming an RBG which is a parameter applied to resource allocation for DL data channel (PDSCH).

The impact of a gap in the frequency domain described in Embodiment 5 occurs when a first band and a segment are non-contiguous in the frequency domain.

Meanwhile, when the first band and the segment are contiguous in the frequency domain, rather than causing the boundary between RBGs to coincide with the boundary between the first band and the segment as in Embodiment 5, forming an RBG without taking into consideration the boundary between the first band and the segment can simplify the processing and possibly reduces the number of RBGs. As a result of this, the number of bits required for resource allocation in a DCI can be reduced, and the overhead for the resource allocation can be reduced.

In this respect, in Embodiment 6, a description will be given of a case where the configuration of RBs forming an RBG is adaptively changed.

A base station and a terminal according to Embodiment 6 have basic configurations common to base station 100 and terminal 200 according to Embodiment 1, so that a description will be given while FIGS. 3 and 4 are incorporated herein.

Note that, the method of indicating the information (bandwidth) on the first band and the information (bandwidth) on the segment (additional band) from base station 100 to terminal 200 and the method of configuring (start and end of using) the segment for terminal 200 by base station 100 are similar to those in Embodiment 1, so that their descriptions will not be repeated, hereinafter. Moreover, the RBG-size determination method according to any of Embodiments 1 to 4 may be used.

Figure 18:
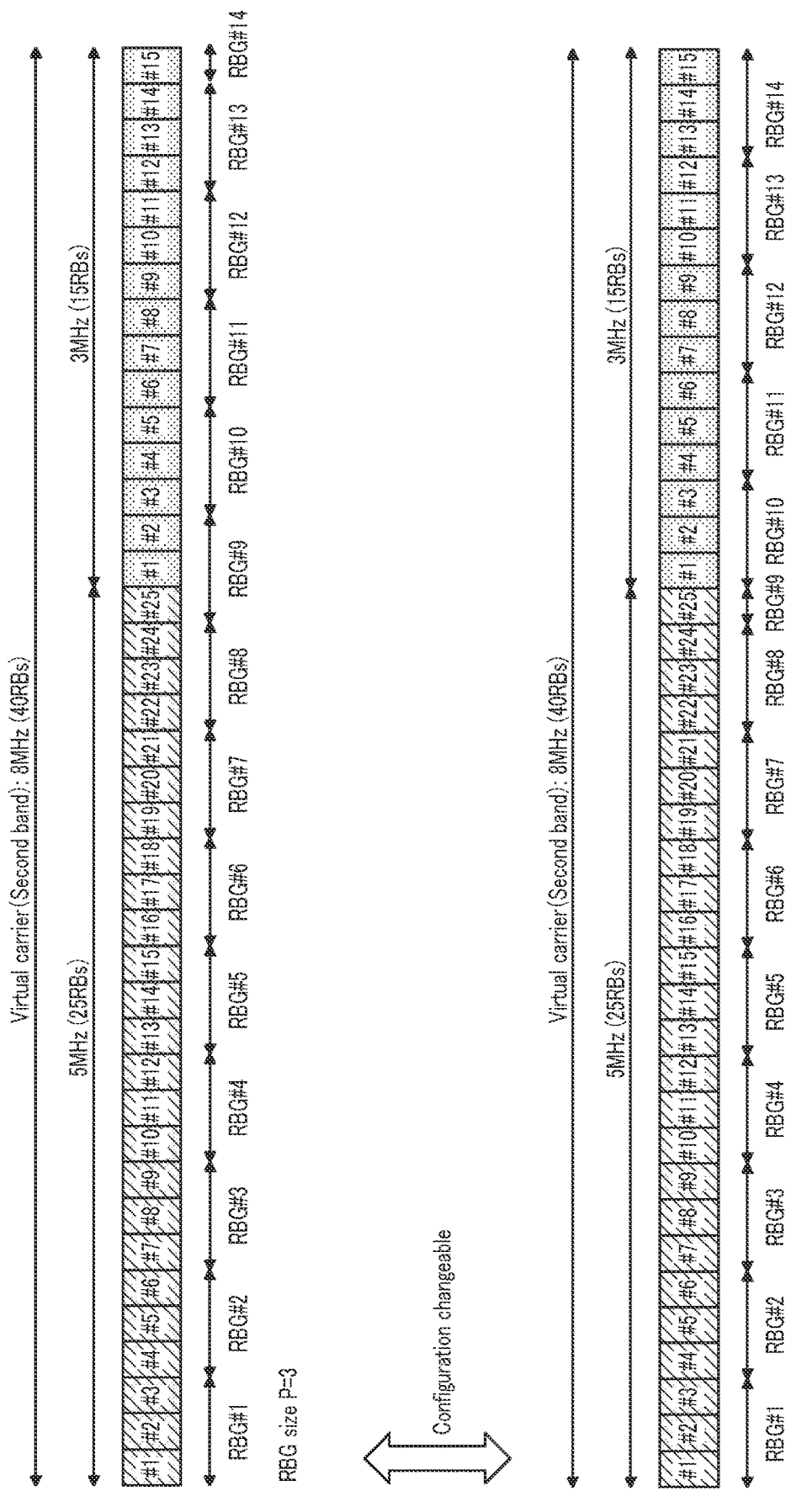
FIG. 18 is a diagram illustrating an example of an RBG-size determination method according to Embodiment 6.

FIG. 18 illustrates an example of an RBG determination method according to this embodiment. In FIG. 18, an assumption is made that the RBG size of the virtual carrier is P=3.

When a first band and a segment forming a virtual carrier are contiguous in the frequency domain, base station 100 (controller 101) configures an RBG without taking into consideration the boundary between the first band and the segment. For example, as illustrated in the upper diagram of FIG. 18, RBG #9 is present, which is composed of both RBs of the first band and the segment, including the RB (RB #25) of the first band and RBs (RBs #1 and #2) of the segment. Note that, depending on the bandwidths of the first band and the segment, there is a possibility that an RBG containing both RBs of the first band and the segment such as RBG #9 of the upper diagram of FIG. 18 does not exist.

Meanwhile, when the first band and the segment contained in a virtual carrier are non-contiguous in the frequency domain, base station 100 (controller 101) configures an RBG in such a way that a boundary between RBGs coincides with the boundary between the first band and the segment as in Embodiment 5. For example, as illustrated in the lower diagram of FIG. 18, each RBG is composed of only an RB or RBs of the first band or only RBs of the segment, and there is no RBG composed of both of an RB of the first band and an RB of the segment.

Base station 100 then indicates information on the boundary between the RBGs for the virtual carrier (information on change in configuration) to terminal 200, using a higher-layer control signal (e.g., system information (MIB or SIB) or RRC signal).

Terminal 200 receives the higher-layer control signal indicated by base station 100 and identifies the configuration of the RBG (RB forming the RBG) for the virtual carrier based on the received higher-layer control signal.

Note that, although the case has been described where an RBG is adaptively configured by signaling (e.g., system information (MIB or SIB) or RRC signal) from base station 100 to terminal 200, base station 100 and terminal 200 may adaptively configure an RBG (an RB or RBs forming the RBG) configured for the virtual carrier, based on the relationship between the first band and the segment in the frequency domain, which are contained in the virtual carrier, for terminal 200.

In the above description, the case has been described where an RBG is configured according to whether the first band and the segment are contiguous or non-contiguous in the frequency domain, but the method of configuring an RBG is not limited to this case. For example, when the size of the gap between the first band and the segment in the frequency domain is a level that does not cause any impact on the scheduling, precoding configuration, channel estimation accuracy and/or the like (e.g., not greater than a threshold), an RBG may be configured in a manner similar to that used in a case where the first band and the segment are contiguous in the frequency domain.

As described above, according to Embodiment 6, the configuration of an RBG is changed according to the contiguity of a first band and a segment forming a virtual carrier in the frequency domain. Accordingly, while the impact caused by a gap in the frequency domain on the RBG is suppressed according to the contiguity of the first band and the segment in the frequency domain, the overhead for resource allocation can be reduced.

Embodiment 7

In Embodiments 1 to 6, the method of determining an RBG (RBG size) that is a parameter applied to resource allocation for DL data channel (PDSCH) has been described. In contrast to this, in this embodiment, a method of determining an RB forming a Precoding Group (PRG) that is another parameter applied to the resource allocation for PDSCH will be described.

In LTE-Advanced, as a precoding configuration method for terminals with respect to PDSCH, there is a method using, as the unit, a radio resource set so called PRG. PRGs are each composed of contiguous multiple RBs as with RBGs. In LTE-Advanced, the number of RBs contained in a PRG is determined in accordance with a system bandwidth (e.g., see NPL 5).

In this respect, in this embodiment, a method similar to the RBG-size determination method described in Embodiments 1 to 4 is used to determine a PRG size. More specifically, in this embodiment, the PRG size can be determined by replacing "RBG" described in Embodiments 1 to 4 with "PRG."

A base station and a terminal according to Embodiment 7 have basic configurations common to base station 100 and terminal 200 according to Embodiment 1, so that a description will be given while FIGS. 3 and 4 are incorporated herein.

Note that, the method of indicating the information (bandwidth) on the first band and the information (bandwidth) on the segment (additional band) from base station 100 to terminal 200 and the method of configuring (start and end of using) the segment for terminal 200 by base station 100 are similar to those in Embodiment 1, so that their descriptions will not be repeated, hereinafter.

More specifically, in base station 100 according to this embodiment, controller 101 determines a parameter (PRG size, herein) for a virtual carrier composed of a first band and a segment, which is an additional band for the first band, and transmitter 113 (corresponding to a transceiver) communicates with terminal 200 in the second band, using the parameter. Moreover, in terminal 200 according to this embodiment, controller 208 determines a parameter (PRG size) for a virtual carrier composed of a first band and a segment, which is an additional band for the first band, and receiver 202 (corresponding to a transceiver) communicates with base station 100 in the second band, using the parameter.

Thus, according to this embodiment, for example, even in a case where the method of adding a segment is applied in a radio communication system that flexibly supports various bandwidths in LTE-Advanced or in a radio communication system that enables flexibly changing the RF bandwidth of a terminal in NR, a parameter (PRG size, herein) required for an operation in a flexible bandwidth (e.g., virtual carrier) can be appropriately determined.

Furthermore, when a PRG size is determined while a band containing a first band and a segment is regarded as one virtual carrier (second band), there is a possibility that a PRG containing both an RB of the first band and an RB of the segment is configured. At this time, when the first band and the segment are non-contiguous in the frequency domain (when a gap exists in the frequency domain), multiple RBs with different channel states are treated as one PRG. For this reason, it is predicted that precoding configuration, channel estimation accuracy, and/or the like for this PRG is negatively affected.

Figure 19:
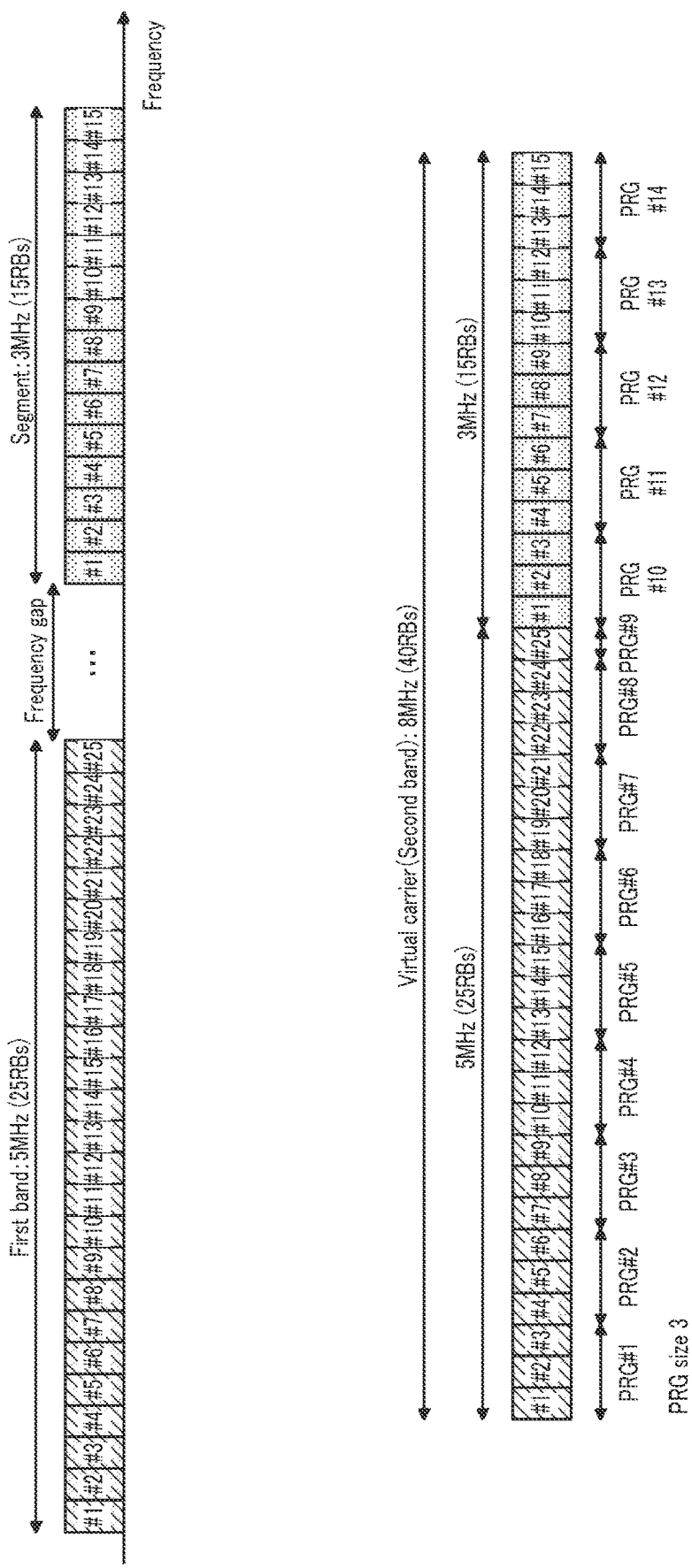
FIG. 19 is a diagram illustrating an example of an RBG-size determination method according to Embodiment 7.

In this respect, in this embodiment, as illustrated in FIG. 19, RBs forming one PRG include only RBs of a first band or only RBs of a segment. In other words, in this embodiment, base station 100 and terminal 200 configure a PRG in such a way that a boundary (range) between PRGs configured for a virtual carrier coincides with the boundary between the first band and the segment contained in the virtual carrier.

For example, as illustrated in FIG. 19, in the vicinity of the boundary between the first band and the segment in the virtual carrier, PRG #9 is composed of one RB of the first band, which is RB #25, and PRG #10 is composed of three RBs of the segment, which are RBs #1 to #3. More specifically, in FIG. 19, the boundary between the PRGs at least coincides with the boundary between the first band and the segment. Stated differently, in FIG. 19, there is no PRG composed of both resource blocks of the first band and the segment that are non-contiguous in the frequency domain. Accordingly, since the RBs in each PRG illustrated in FIG. 19 are contiguous in the frequency domain, their channel states are similar to each other.

Accordingly, in this embodiment, even when the first band and the segment are non-contiguous in the frequency domain, the impact caused by a gap in the frequency domain on precoding configuration, channel estimation accuracy, and/or the like for the PRG configured in the virtual carrier can be suppressed.

Embodiment 8

In this embodiment, a description will be given of a method of determining an RB forming a PRG which is a parameter applied to resource allocation for DL data channel (PDSCH).

The impact of a gap in the frequency domain described in Embodiment 7 occurs when a first band and a segment are non-contiguous in the frequency domain.

Meanwhile, when the first band and the segment are contiguous in the frequency domain, rather than causing the boundary between the PRGs to coincide with the boundary between the first band and the segment as in Embodiment 7, forming a PRG without taking into consideration the boundary between the first band and the segment can simplify the processing. For example, when a PRG is configured without taking into consideration the boundary between the first band and the segment as described in Embodiment 6 (e.g., RBG in the upper diagram of FIG. 18), PRG allocation and precoding configuration can be simplified.

In this respect, in Embodiment 8, a description will be given of a case where the configuration of RB s forming a PRG is adaptively changed.

A base station and a terminal according to Embodiment 8 have basic configurations common to base station 100 and terminal 200 according to Embodiment 1, so that a description will be given while FIGS. 3 and 4 are incorporated herein.

Note that, the method of indicating the information (bandwidth) on the first band and the information (bandwidth) on the segment (additional band) from base station 100 to terminal 200 and the method of configuring (start and end of using) the segment for terminal 200 by base station 100 are similar to those in Embodiment 1, so that their descriptions will not be repeated, hereinafter. Moreover, the RBG-size determination method according to any of Embodiments 1 to 4 may be used. In other words, in this embodiment, the PRG-size can be determined by replacing "RBG" described in Embodiments 1 to 4 with "PRG."

Figure 20:
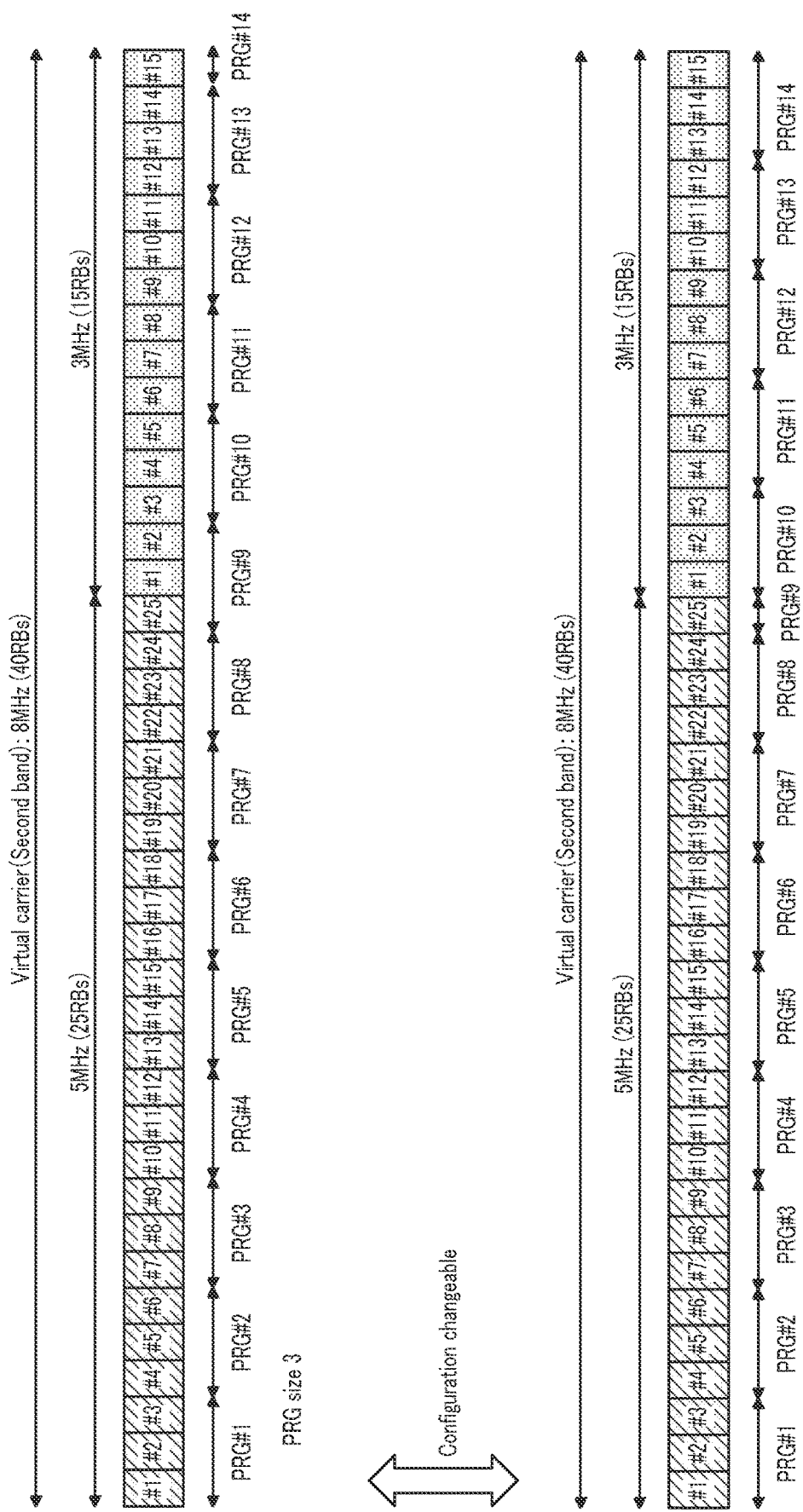
FIG. 20 is a diagram illustrating an example of an RBG-size determination method according to Embodiment 8.

FIG. 20 illustrates an example of a PRG determination method according to this embodiment. In FIG. 20, an assumption is made that the PRG size of the virtual carrier is three (3 RBs).

When a first band and a segment forming a virtual carrier are contiguous in the frequency domain, base station 100 (controller 101) configures a PRG without taking into consideration the boundary between the first band and the segment. For example, as illustrated in the upper diagram of FIG. 20, PRG #9 is present, which is composed of both RBs of the first band and the segment, including the RB (RB #25) of the first band and RBs (RBs #1 and #2) of the segment. Note that, depending on the bandwidths of the first band and the segment, there is a possibility that a PRG containing both RBs of the first band and the segment such as PRG #9 of the upper diagram of FIG. 20 does not exist.

Meanwhile, when the first band and the segment contained in a virtual carrier are non-contiguous in the frequency domain, base station 100 (controller 101) configures a PRG in such a way that a boundary between PRGs coincides with the boundary between the first band and the segment as in Embodiment 7. For example, as illustrated in the lower diagram of FIG. 20, each PRG is composed of only an RB or RBs of the first band or only RBs of the segment, and there is no PRG composed of both of an RB of the first band and an RB of the segment.

Base station 100 then indicates information on the boundary between the PRGs for the virtual carrier (information on change in configuration) to terminal 200, using a higher-layer control signal (e.g., system information (MIB or SIB) or RRC signal).

Terminal 200 receives the higher-layer control signal indicated by base station 100 and identifies the configuration of the PRG (RB forming the PRG) for the virtual carrier based on the received higher-layer control signal.

Note that, although the case has been described where a PRG is adaptively configured by signaling (e.g., system information (MIB or SIB) or RRC signal) from base station 100 to terminal 200, base station 100 and terminal 200 may adaptively configure a PRG (an RB or RBs forming the PRG) configured for the virtual carrier, based on the relationship between the first band and the segment in the frequency domain, which are contained in the virtual carrier, for terminal 200.

As described above, according to Embodiment 8, the configuration of a PRG is changed according to the contiguity of a first band and a segment forming a virtual carrier in the frequency domain. Accordingly, while the impact caused by a gap in the frequency domain on the PRG is suppressed according to the contiguity of the first band and the segment in the frequency domain, the processing can be simplified.

Embodiment 9

In Embodiments 1 to 8, a method of determining an RBG or PRG that is a parameter applied to resource allocation for DL data channel (PDSCH) has been described. In contrast to this, in this embodiment, a method of determining a parameter required for a terminal to feedback Channel State Information (CSI) for a virtual carrier (second band) to a base station will be described.

In LTE-Advanced, as the CSI feedback information, there are a wideband Channel Quality Indicator (CQI) in which the feedback bandwidth is wideband (entire band), and a subband CQI in which the feedback bandwidth is in units of subbands. Subbands (may be called "CSI subbands") are each composed of multiple contiguous RBs as in RBGs or PRGs. In LTE-Advanced, the number of RBs contained in a CSI subband is determined in accordance with a system bandwidth (e.g., see NPL 5).

In this respect, in this embodiment, a method similar to the RBG-size determination method described in Embodiments 1 to 4 is used to determine a CSI subband size. More specifically, in this embodiment, the CSI subband size can be determined by replacing "RBG" described in Embodiments 1 to 4 with "CSI subband."

A base station and a terminal according to Embodiment 9 have basic configurations common to base station 100 and terminal 200 according to Embodiment 1, so that a description will be given while FIGS. 3 and 4 are incorporated herein.

Note that, the method of indicating the information (bandwidth) on the first band and the information (bandwidth) on the segment (additional band) from base station 100 to terminal 200 and the method of configuring (start and end of using) the segment for terminal 200 by base station 100 are similar to those in Embodiment 1, so that their descriptions will not be repeated, hereinafter.

More specifically, in base station 100 according to this embodiment, controller 101 determines a parameter (CSI subband size, herein) for a virtual carrier composed of a first band and a segment, which is an additional band for the first band, and receiver 115 (corresponding to a transceiver, and including extractor 117) communicates with terminal 200 in the second band, using the parameter. Moreover, in terminal 200 according to this embodiment, controller 208 determines a parameter (CSI subband size) for a virtual carrier composed of a first band and a segment, which is an additional band for the first band, and transmitter 215 (corresponding to a transceiver, and including signal assigner 213) communicates with base station 100 in the second band, using the parameter.

Thus, according to this embodiment, for example, even in a case where the method of adding a segment is applied in a radio communication system that flexibly supports various bandwidths in LTE-Advanced or in a radio communication system that enables flexibly changing the RF bandwidth of a terminal in NR, a parameter (CSI subband size, herein) required for an operation in a flexible bandwidth (e.g., virtual carrier) can be appropriately determined.

Furthermore, when a CSI subband is determined while a band containing a first band and a segment is regarded as one virtual carrier (second band), there is a possibility that a CSI subband containing both an RB of the first band and an RB of the segment is configured. At this time, when the first band and the segment are non-contiguous in the frequency domain (when a gap exists in the frequency domain), multiple RBs with different channel states are treated as one CSI subband. For this reason, CSI feedback with high accuracy becomes difficult even when this CSI subband is used.

Figure 21:
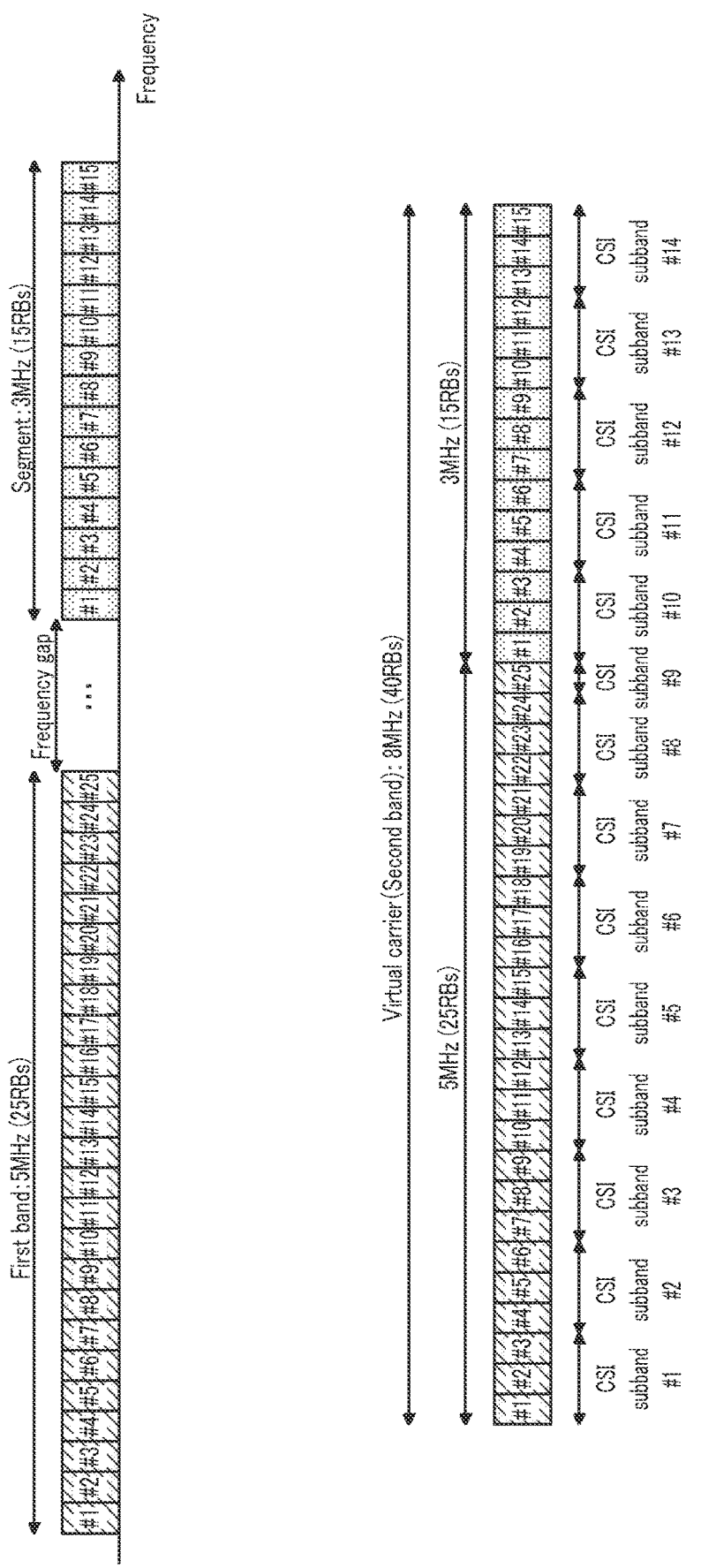
FIG. 21 is a diagram illustrating an example of a CSI subband-size determination method according to Embodiment 9.

In this respect, in this embodiment, as illustrated in FIG. 21, RBs forming one CSI subband include only RBs of a first band or only RBs of a segment. In other words, in this embodiment, base station 100 and terminal 200 configure a CSI subband in such a way that a boundary (range) between CSI subbands configured for a virtual carrier coincides with the boundary between the first band and the segment contained in the virtual carrier.

For example, as illustrated in FIG. 21, in the vicinity of the boundary between the first band and the segment in the virtual carrier, CSI subband #9 is composed of one RB of the first band, which is RB #25, and CSI subband #10 is composed of three RBs of the segment, which are RBs #1 to #3. More specifically, in FIG. 21, the boundary between the CSI subbands at least coincides with the boundary between the first band and the segment. Stated differently, in FIG. 21, there is no CSI subband composed of both resource blocks of the first band and the segment that are non-contiguous in the frequency domain. Accordingly, since the RBs in each CSI subband illustrated in FIG. 21 are contiguous in the frequency domain, their channel states are similar to each other.

Accordingly, in this embodiment, even when the first band and the segment are non-contiguous in the frequency domain, the impact caused by a gap in the frequency domain on the CSI feedback accuracy using the CSI subband configured in the virtual carrier can be suppressed.

Note that, when terminal 200 is configured to operate in a mode using a wideband CQI, the bandwidth of the wideband CQI may be configured in each of the first band and the segment.

Embodiment 10

In this embodiment, a description will be given of a method of determining an RB forming a CSI subband which is a parameter required for a terminal to feedback CSI for a virtual carrier to a base station.

The impact of a gap in the frequency domain described in Embodiment 9 occurs when a first band and a segment are non-contiguous in the frequency domain.

Meanwhile, when the first band and the segment are contiguous in the frequency domain, rather than causing the boundary between the CSI subbands to coincide with the boundary between the first band and the segment as in Embodiment 9, forming a CSI subband without taking into consideration the boundary between the first band and the segment can simplify the processing.

In this respect, in Embodiment 10, a description will be given of a case where the configuration of RB s forming a CSI subband is adaptively changed.

A base station and a terminal according to Embodiment 10 have basic configurations common to base station 100 and terminal 200 according to Embodiment 1, so that a description will be given while FIGS. 3 and 4 are incorporated herein.

Note that, the method of indicating the information (bandwidth) on the first band and the information (bandwidth) on the segment (additional band) from base station 100 to terminal 200 and the method of configuring (start and end of using) the segment for terminal 200 by base station 100 are similar to those in Embodiment 1, so that their descriptions will not be repeated, hereinafter. Moreover, the RBG-size determination method according to any of Embodiments 1 to 4 may be used for the CSI subband size determination method. More specifically, in this embodiment, the CSI subband size can be determined by replacing "RBG" described in Embodiments 1 to 4 with "CSI subband."

Figure 22:
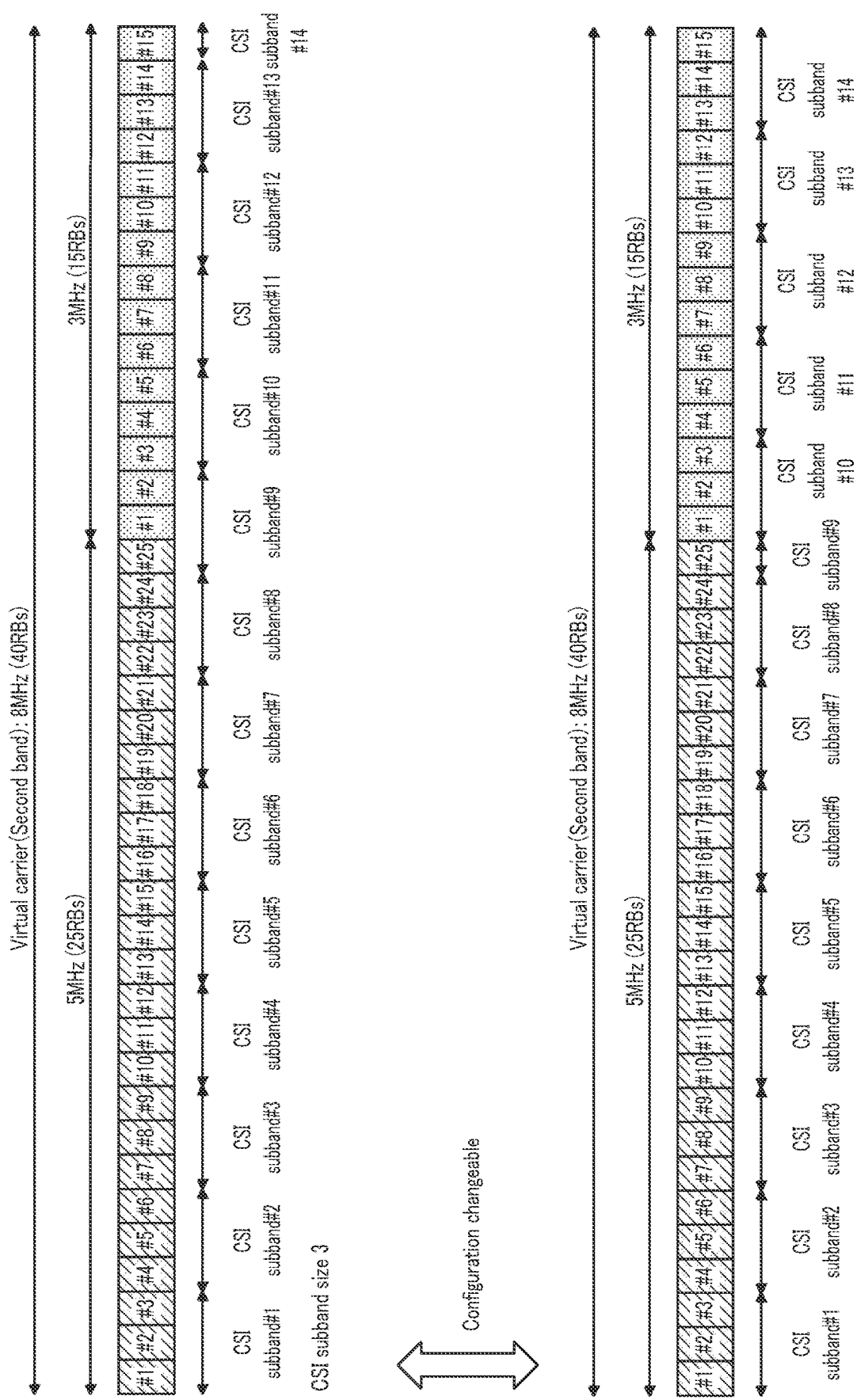
FIG. 22 is a diagram illustrating an example of a CSI subband-size determination method according to Embodiment 10.

FIG. 22 illustrates an example of a CSI subband determination method according to this embodiment. In FIG. 22, an assumption is made that the CSI subband size of the virtual carrier is three (3 RBs).

When a first band and a segment are contiguous in the frequency domain, base station 100 (controller 101) configures a CSI subband without taking into consideration the boundary between the first band and the segment. For example, as illustrated in the upper diagram of FIG. 22, CSI subband #9 is present, which is composed of both RB s of the first band and the segment, including the RB (RB #25) of the first band and RBs (RBs #1 and #2) of the segment. Note that, depending on the bandwidths of the first band and the segment, there is a possibility that a CSI subband containing both RBs of the first band and the segment such as CSI subband #9 of the upper diagram of FIG. 22 does not exist.

Meanwhile, when the first band and the segment contained in a virtual carrier are non-contiguous in the frequency domain, base station 100 (controller 101) configures a CSI subband in such a way that a boundary between CSI subbands coincides with the boundary between the first band and the segment as in Embodiment 9. For example, as illustrated in the lower diagram of FIG. 22, each CSI subband is composed of only an RB or RBs of the first band or only RBs of the segment, and there is no CSI subband composed of both of an RB of the first band and an RB of the segment.

Base station 100 then indicates information on the boundary between the CSI subbands for the virtual carrier (information on change in configuration) to terminal 200, using a higher-layer control signal (e.g., system information (MIB or SIB) or RRC signal).

Terminal 200 receives the higher-layer control signal indicated by base station 100 and identifies the configuration of the CSI subband (RB forming the CSI subband) for the virtual carrier based on the received higher-layer control signal.

Note that, although the case has been described where a CSI subband is adaptively configured by signaling (e.g., system information (MIB or SIB) or RRC signal) from base station 100 to terminal 200, base station 100 and terminal 200 may adaptively configure a CSI subband (an RB or RBs forming the CSI subband) configured for the virtual carrier, based on the relationship between the first band and the segment in the frequency domain, which are contained in the virtual carrier, for terminal 200.

As described above, according to Embodiment 10, the configuration of a CSI subband is changed according to the contiguity of a first band and a segment forming a virtual carrier in the frequency domain. Accordingly, while the impact caused by a gap in the frequency domain on the CSI feedback accuracy is suppressed according to the contiguity of the first band and the segment in the frequency domain, the processing can be simplified.

Embodiment 11

In Embodiments 1 to 10, a method of determining an RBG or PRG that is a parameter applied to resource allocation for DL data channel (PDSCH), or a CSI transmitted from a terminal to a base station as feedback has been described. In contrast to this, in this embodiment, a method of determining a parameter required for a terminal to transmit a Sounding Reference Signal (SRS) for a virtual carrier (second band) to a base station will be described.

In LTE-Advanced, terminals can transmit an SRS as a reference signal for UL channel quality measurement. As for an SRS transmission method, there are a wideband SRS in which the bandwidth is wideband (entire band), and a subband SRS in which the bandwidth is in units of subbands. Subbands (may be called "SRS subbands") are each composed of multiple contiguous RBs as in RBGs, PRGs, or CSI subbands. In LTE-Advanced, the number of RBs contained in an SRS subband is determined in accordance with a system bandwidth (e.g., see NPL 6).

In this respect, in this embodiment, a method similar to the RBG-size determination method described in Embodiments 1 to 4 is used to determine an SRS subband size. More specifically, in this embodiment, the SRS subband size can be determined by replacing "RBG" described in Embodiments 1 to 4 with "SRS subband."

A base station and a terminal according to Embodiment 11 have basic configurations common to base station 100 and terminal 200 according to Embodiment 1, so that a description will be given while FIGS. 3 and 4 are incorporated herein.

Note that, the method of indicating the information (bandwidth) on the first band and the information (bandwidth) on the segment (additional band) from base station 100 to terminal 200 and the method of configuring (start and end of using) the segment for terminal 200 by base station 100 are similar to those in Embodiment 1, so that their descriptions will not be repeated, hereinafter.

More specifically, in base station 100 according to this embodiment, controller 101 determines a parameter (SRS subband size, herein) for a virtual carrier composed of a first band and a segment, which is an additional band for the first band, and receiver 115 (corresponding to a transceiver, and including extractor 117) communicates with terminal 200 in the second band, using the parameter. Moreover, in terminal 200 according to this embodiment, controller 208 determines a parameter (SRS subband size) for a virtual carrier composed of a first band and a segment, which is an additional band for the first band, and transmitter 215 (corresponding to a transceiver, and including signal assigner 213) communicates with base station 100 in the second band, using the parameter.

Thus, according to this embodiment, for example, even in a case where the method of adding a segment is applied in a radio communication system that flexibly supports various bandwidths in LTE-Advanced or in a radio communication system that enables flexibly changing the RF bandwidth of a terminal in NR, a parameter (SRS subband size, herein) required for an operation in a flexible bandwidth (e.g., virtual carrier) can be appropriately determined.

Furthermore, when an SRS subband is determined while a band containing a first band and a segment is regarded as one virtual carrier (second band), there is a possibility that an SRS subband containing both an RB of the first band and an RB of the segment is configured. At this time, when the first band and the segment are non-contiguous in the frequency domain (when a gap exists in the frequency domain), multiple RBs with different channel states are treated as one SRS subband. For this reason, it becomes difficult for base station 100 to perform accurate channel quality measurement even when this SRS subband is used.

Figure 23:
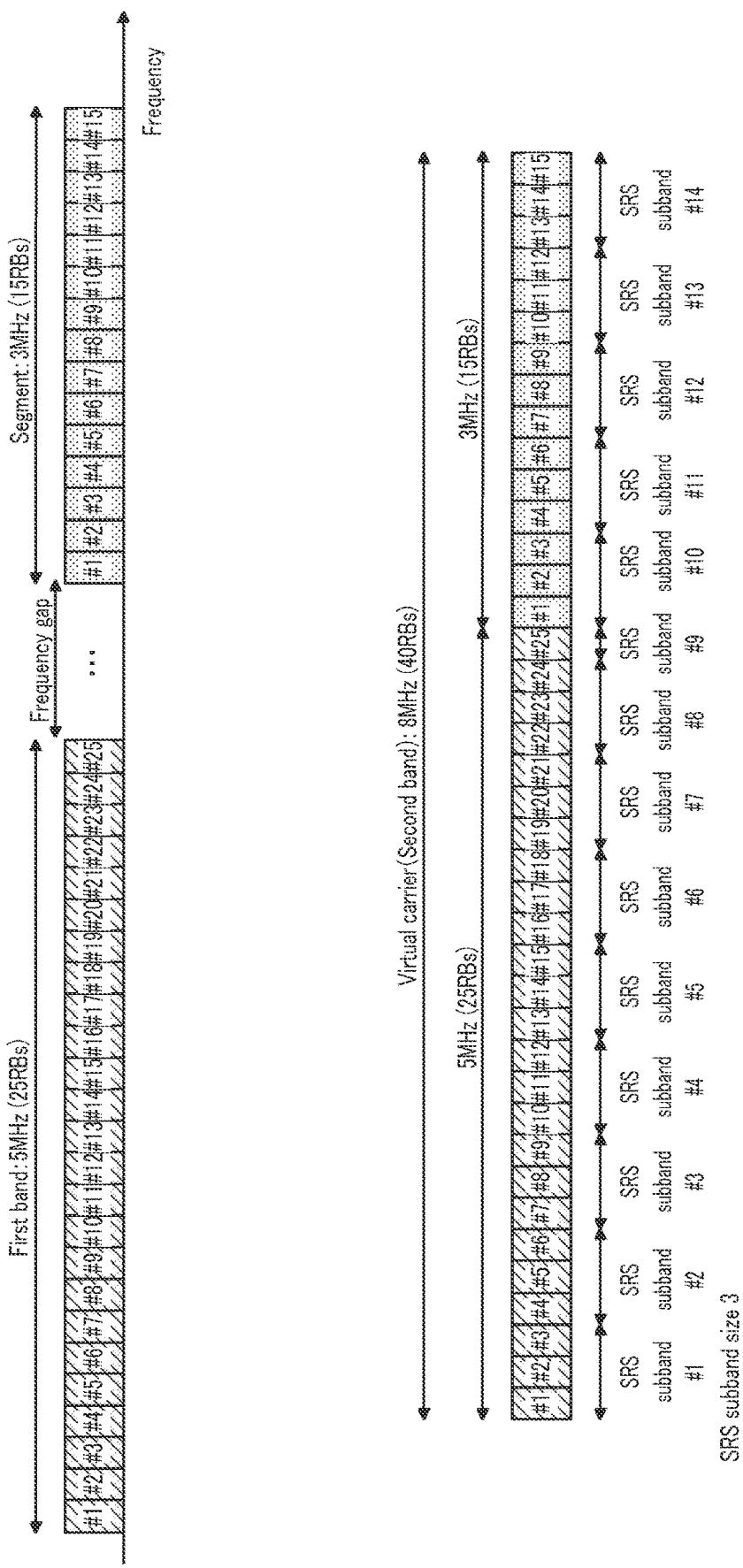
FIG. 23 is a diagram illustrating an example of an SRS subband-size determination method according to Embodiment 11.

In this respect, in this embodiment, as illustrated in FIG. 23, RBs forming one SRS subband include only RBs of a first band or only RBs of a segment. In other words, in this embodiment, base station 100 and terminal 200 configure an SRS subband in such a way that a boundary (range) between SRS subbands configured for a virtual carrier coincides with the boundary between the first band and the segment contained in the virtual carrier.

For example, as illustrated in FIG. 23, in the vicinity of the boundary between the first band and the segment in the virtual carrier, SRS subband #9 is composed of one RB of the first band, which is RB #25, and CSI subband #10 is composed of three RBs of the segment, which are RBs #1 to #3. More specifically, in FIG. 23, the boundary between the SRS subbands at least coincides with the boundary between the first band and the segment. Stated differently, in FIG. 23, there is no SRS subband composed of both resource blocks of the first band and the segment that are non-contiguous in the frequency domain. Accordingly, since the RBs in each SRS subband illustrated in FIG. 23 are contiguous in the frequency domain, their channel states are similar to each other.

Accordingly, in this embodiment, even when the first band and the segment are non-contiguous in the frequency domain, the impact caused by a gap in the frequency domain on the channel quality measurement accuracy using the SRS subband configured in the virtual carrier can be suppressed.

Note that, when terminal 200 is configured to operate in a mode using a wideband SRS, the bandwidth of the wideband SRS may be configured in each of the first band and the segment.

Embodiment 12

In this embodiment, a description will be given of a method of determining an RB forming an SRS subband which is a parameter required for a terminal to transmit an SRS for a virtual carrier to a base station.

The impact of a gap in the frequency domain described in Embodiment 11 occurs when a first band and a segment are non-contiguous in the frequency domain.

Meanwhile, when the first band and the segment are contiguous in the frequency domain, rather than causing the boundary between the SRS subbands to coincide with the boundary between the first band and the segment as in Embodiment 11, forming an SRS subband without taking into consideration the boundary between the first band and the segment can simplify the processing.

In this respect, in Embodiment 12, a description will be given of a case where the configuration of RBs forming an SRS subband is adaptively changed.

A base station and a terminal according to Embodiment 12 have basic configurations common to base station 100 and terminal 200 according to Embodiment 1, so that a description will be given while FIGS. 3 and 4 are incorporated herein.

Note that, the method of indicating the information (bandwidth) on the first band and the information (bandwidth) on the segment (additional band) from base station 100 to terminal 200 and the method of configuring (start and end of using) the segment for terminal 200 by base station 100 are similar to those in Embodiment 1, so that their descriptions will not be repeated, hereinafter. Moreover, the RBG-size determination method according to any of Embodiments 1 to 4 may be used for the SRS subband size determination method. More specifically, in this embodiment, the SRS subband size can be determined by replacing "RBG" described in Embodiments 1 to 4 with "SRS subband."

Figure 24:
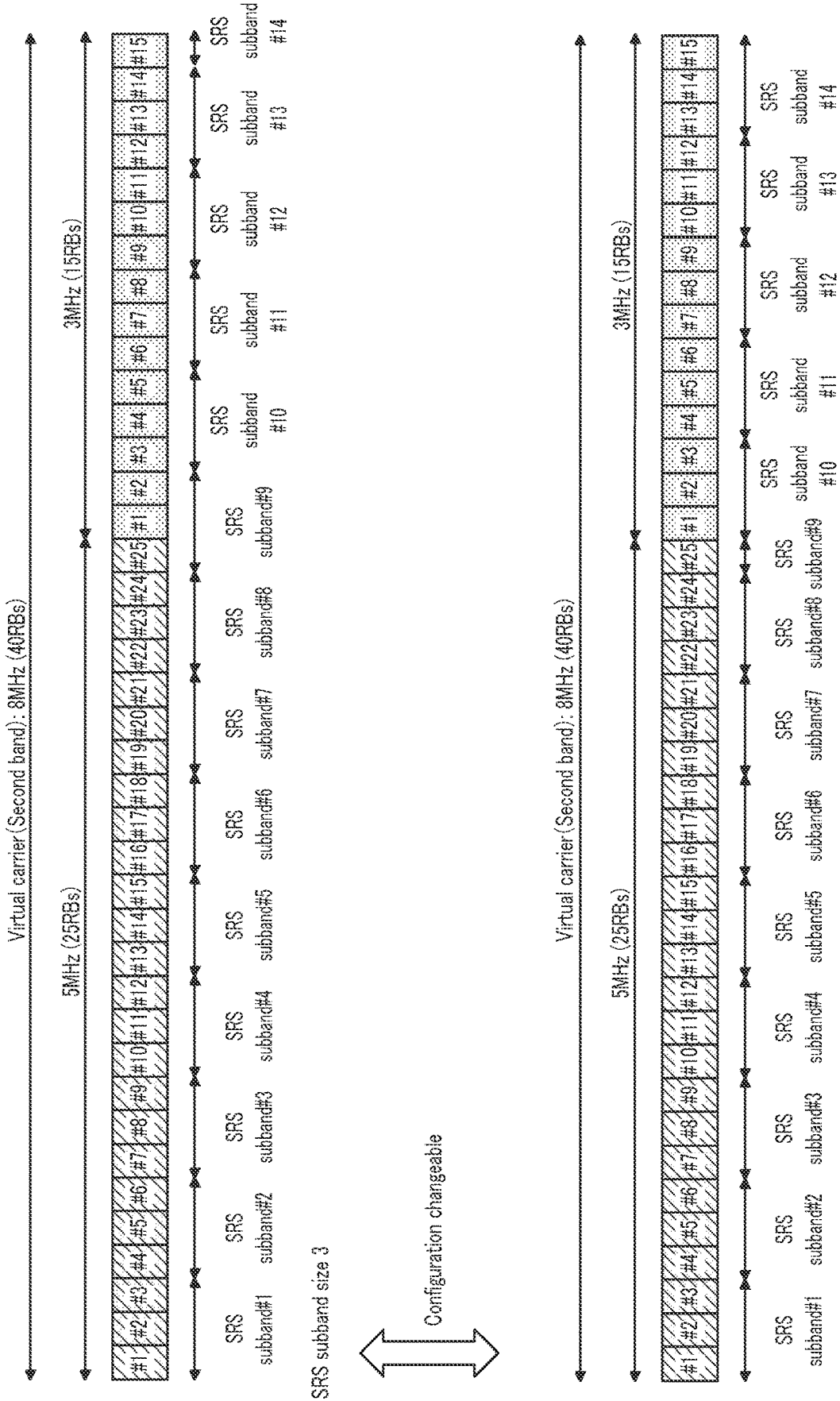
FIG. 24 is a diagram illustrating an example of an SRS subband-size determination method according to Embodiment 12.

FIG. 24 illustrates an example of an SRS subband determination method according to this embodiment. In FIG. 24, an assumption is made that the SRS subband size of the virtual carrier is three (3 RBs).

When a first band and a segment are contiguous in the frequency domain, base station 100 (controller 101) configures an SRS subband without taking into consideration the boundary between the first band and the segment. For example, as illustrated in the upper diagram of FIG. 24, SRS subband #9 is present, which is composed of both RBs of the first band and the segment, including the RB (RB #25) of the first band and RBs (RBs #1 and #2) of the segment. Note that, depending on the bandwidths of the first band and the segment, there is a possibility that an SRS subband containing both RBs of the first band and the segment such as SRS subband #9 of the upper diagram of FIG. 24 does not exist.

Meanwhile, when the first band and the segment contained in a virtual carrier are non-contiguous in the frequency domain, base station 100 (controller 101) configures an SRS subband in such a way that a boundary between SRS subbands coincides with the boundary between the first band and the segment as in Embodiment 11. For example, as illustrated in the lower diagram of FIG. 24, each SRS subband is composed of only an RB or RBs of the first band or only RBs of the segment, and there is no SRS subband composed of both of an RB of the first band and an RB of the segment.

Base station 100 then indicates information on the boundary between the SRS subbands for the virtual carrier (information on change in configuration) to terminal 200, using a higher-layer control signal (e.g., system information (MIB or SIB) or RRC signal).

Terminal 200 receives the higher-layer control signal indicated by base station 100 and identifies the configuration of the SRS subband (RB forming the SRS subband) for the virtual carrier based on the received higher-layer control signal.

Note that, although the case has been described where an SRS subband is adaptively configured by signaling (e.g., system information (MIB or SIB) or RRC signal) from base station 100 to terminal 200, base station 100 and terminal 200 may adaptively configure an SRS subband (an RB or RB s forming the SRS subband) configured for the virtual carrier, based on the relationship between the first band and the segment in the frequency domain, which are contained in the virtual carrier, for terminal 200.

As described above, according to Embodiment 12, the configuration of an SRS subband is changed according to the contiguity of a first band and a segment forming a virtual carrier in the frequency domain. Accordingly, while the impact caused by a gap in the frequency domain on the channel quality measurement accuracy in base station 100 is suppressed according to the contiguity of the first band and the segment in the frequency domain, the processing can be simplified.

Each embodiment of the present disclosure has been described thus far.

Note that, in Embodiments 5 to 12, a description has been given of the method of causing the boundary between RBGs, PRGs, CSI subbands, or SRS subbands to coincide with the boundary between a first band and a segment when the first band and the segment are non-contiguous in the frequency domain with respect to these parameters. However, when the first band and the segment are v in the frequency domain, an RBG, a PRG, a CSI subband, or an SRS subband may be configured without taking into consideration the boundary between the first band and the segment. In this case, for example, as to the PRG, in a PRG composed of an RB of the first band and RBs of the segment (e.g., PRG #9 in the upper diagram of FIG. 20), different precoding may be applied to RBs in the same PRG (RB #25, and RBs #1 and #2 in PRG #9 in the upper diagram of FIG. 20). Moreover, as to the CSI subband and SRS subband, terminal 200 may drop transmission of a CSI subband composed of an RB of the first band and RBs of the segment (e.g., CSI subband #9 in the upper diagram of FIG. 22) and an SRS subband composed of the same (SRS subband #9 in the upper diagram of FIG. 24).

The present disclosure can be realized by software, hardware, or software in cooperation with hardware. Each functional block used in the description of each embodiment described above can be partly or entirely realized by an LSI such as an integrated circuit, and each process described in each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI herein may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a Field Programmable Gate Array (FPGA) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

A base station according to this disclosure includes: circuitry, which, in operation, determines a parameter for a band composed of a first band and a segment that is an additional band for the first band, the band composed of the first band and the segment being referred to a second band; and a transceiver, which in operation, communicates with a terminal in the second band, using the parameter.

In the base station according to this disclosure, the parameter is a resource block group (RBG) size configured in the second band, and the circuitry determines the RBG size based on a bandwidth of the second band.

In the base station according to this disclosure, the parameter is a resource block group (RBG) size configured in the second band, and the circuitry determines the RBG size of the second band to be X times (provided that X is an integer equal to or greater than two) of an RBG size configured based on a bandwidth of the first band.

In the base station according to this disclosure, the parameter is a resource block group (RBG) size configured in the second band, and the circuitry determines a power-of-two for the RBG size.

In the base station according to this disclosure, the RBG size is variable, and the RBG size is indicated to the terminal from the base station.

In the base station according to this disclosure, the circuitry configures the RBG such that a boundary between a plurality of the RBGs configured in the second band coincides with a boundary between the first band and the segment.

A terminal according to this disclosure includes: circuitry, which, in operation, determines a parameter for a band composed of a first band and a segment that is an additional band for the first band, the band composed of the first band and the segment being referred to as a second band; and a transceiver, which in operation, communicates with a base station in the second band, using the parameter.

A communication method according to this disclosure includes: determining a parameter for a band composed of a first band and a segment that is an additional band for the first band, the band composed of the first band and the segment being referred to as a second band; and communicating with a terminal in the second band, using the parameter.

A communication method according to this disclosure includes: determining a parameter for a band composed of a first band and a segment that is an additional band for the first band, the band composed of the first band and the segment being referred to as a second band; and communicating with a base station in the second band, using the parameter.

INDUSTRIAL APPLICABILITY

An aspect of this disclosure is useful in mobile communication systems.

REFERENCE SIGNS LIST

100 Base station
101, 208 Controller
102 Data generator
103, 106, 109, 210 Encoder
104, 107, 110, 211 Modulator
105 Upper-layer control signal generator
108 DL control signal generator
111, 213 Signal assigner
112, 214 IFFT processor
113, 215 Transmitter
114, 201 Antenna
115, 202 Receiver
116, 203 FFT processor
117, 204 Extractor
118 CSI demodulator
119 SRS measurer
205 DL control signal demodulator
206 Upper-layer control signal demodulator
207 DL data signal demodulator
209 CSI generator
212 SRS generator

The invention claimed is:

1. A communication apparatus comprising:
    circuitry, which, in operation, determines a number of resource blocks that form a resource block group, wherein the resource block group is a unit used to allocate a resource to the communication apparatus, in a first bandwidth or in a second bandwidth, wherein a size of the first bandwidth is different from a size of the second bandwidth, and each of a subcarrier spacing for the first bandwidth and a subcarrier spacing for the second bandwidth is configured to one of a plurality of subcarrier spacings; and
    a transceiver, which is coupled to the circuitry and which, in operation, communicates with a base station using the resource,
    wherein one of the number of resource blocks set for the first bandwidth and the number of resource blocks set for the second bandwidth is an integer multiple of the other, and the number of resource blocks set for the first bandwidth and the number of resource blocks set for the second bandwidth are values that are a power of two.

2. The communication apparatus according to claim 1, wherein the number of resource blocks for the first bandwidth is determined based on the size of the first bandwidth, and the number of resource blocks for the second bandwidth is determined based on the size of the second bandwidth.

3. The communication apparatus according to claim 1, wherein the number of resource blocks for the second bandwidth is determined based on the size of the second bandwidth and not based on the size of the first bandwidth.

4. The communication apparatus according to claim 1, wherein a subcarrier spacing of subcarriers that form one resource block in the second bandwidth is different from a subcarrier spacing of subcarriers that form one resource block in the first bandwidth.

5. The communication apparatus according to claim 4, wherein a number of subcarriers that form one resource block is 12 regardless of the subcarrier spacing of subcarriers.

6. The communication apparatus according to claim 1, wherein the transceiver, in operation, receives, from the base station, information related to the number of resource blocks that form the resource block group.

7. The communication apparatus according to claim 1, wherein the transceiver, in operation, receives, from the base station, information related to the size of the first bandwidth and information related to the size of the second bandwidth.

8. The communication apparatus according to claim 1, wherein the transceiver, in operation, receives, from the base station, control information in the first bandwidth, and receives, from the base station, data in the second bandwidth.

9. The communication apparatus according to claim 1, wherein each of the subcarrier spacing for the first bandwidth and the subcarrier spacing for the second bandwidth is 15 kHz, 30 kHz or 60 kHz.

10. A communication method comprising:
    determining a number of resource blocks that form a resource block group, wherein the resource block group is a unit used to allocate a resource to a terminal, in a first bandwidth or in a second bandwidth, wherein a size of the first bandwidth is different from a size of the second bandwidth, and each of a subcarrier spacing for the first bandwidth and a subcarrier spacing for the second bandwidth is configured to one of a plurality of subcarrier spacings; and
    communicating with a base station using the resource,
    wherein one of the number of resource blocks set for the first bandwidth and the number of resource blocks set for the second bandwidth is an integer multiple of the other, and the number of resource blocks set for the first bandwidth and the number of resource blocks set for the second bandwidth are values that are a power of two.

11. The communication method according to claim 10, wherein the number of resource blocks for the first bandwidth is determined based on the size of the first bandwidth, and the number of resource blocks for the second bandwidth is determined based on the size of the second bandwidth.

12. The communication method according to claim 10, wherein the number of resource blocks for the second bandwidth is determined based on the size of the second bandwidth and not based on the size of the first bandwidth.

13. The communication method according to claim 10, wherein a subcarrier spacing of subcarriers that form one resource block in the second bandwidth is different from a subcarrier spacing of subcarriers that form one resource block in the first bandwidth.

14. The communication method according to claim 13, wherein a number of subcarriers that form one resource block is 12 regardless of the subcarrier spacing of subcarriers.

15. The communication method according to claim 10, wherein the communicating includes receiving, from the base station, information related to the number of resource blocks that form the resource block group.

16. The communication method according to claim 10, wherein the communicating includes receiving, from the base station, information related to the size of the first bandwidth and information related to the size of the second bandwidth.

17. The communication method according to claim 10, wherein the communicating includes receiving, from the base station, control information in the first bandwidth, and receiving, from the base station, data in the second bandwidth.

18. The communication method according to claim 10, wherein each of the subcarrier spacing for the first bandwidth and the subcarrier spacing for the second bandwidth is 15 kHz, 30 kHz or 60 kHz.

* * * * *